United States Patent
Palmer et al.

(10) Patent No.: US 10,101,486 B1
(45) Date of Patent: Oct. 16, 2018

(54) SEISMIC-WHILE-DRILLING SURVEY SYSTEMS AND METHODS

(71) Applicant: DataCloud International, Inc., Seattle, WA (US)

(72) Inventors: Daniel Palmer, Santa Barbara, CA (US); Krishna Srinivasan, Menlo Park, CA (US)

(73) Assignee: DATACLOUD INTERNATIONAL, INC., Seattle, WA (US)

( * ) Notice: Subject to any disclaimer, the term of this patent is extended or adjusted under 35 U.S.C. 154(b) by 0 days.

(21) Appl. No.: 15/674,459

(22) Filed: Aug. 10, 2017

(51) Int. Cl.
| | |
|---|---|
| *G01V 1/50* | (2006.01) |
| *E21B 49/00* | (2006.01) |
| *E21B 47/00* | (2012.01) |
| *E21B 41/00* | (2006.01) |
| *E21B 47/09* | (2012.01) |
| *E21B 47/12* | (2012.01) |
| *G01V 1/24* | (2006.01) |

(Continued)

(52) U.S. Cl.
CPC ............ *G01V 1/50* (2013.01); *E21B 41/0092* (2013.01); *E21B 47/0002* (2013.01); *E21B 47/0905* (2013.01); *E21B 47/122* (2013.01); *E21B 49/00* (2013.01); *G01V 1/164* (2013.01); *G01V 1/181* (2013.01); *G01V 1/247* (2013.01); *G01V 99/005* (2013.01); *G01V 2200/12* (2013.01); *G01V 2210/66* (2013.01)

(58) Field of Classification Search
CPC .......... G01V 1/50; G01V 1/164; G01V 1/181; G01V 1/247; G01V 99/005; G01V 2200/12; G01V 2210/66; E21B 41/0092; E21B 47/0002; E21B 47/0905; E21B 47/122; E21B 49/00
See application file for complete search history.

(56) References Cited

U.S. PATENT DOCUMENTS

| | | | |
|---|---|---|---|
| 4,926,391 A | | 5/1990 | Rector et al. |
| 6,630,890 B1 | * | 10/2003 | Endo .................. G01V 1/22 |
| | | | 181/122 |

(Continued)

FOREIGN PATENT DOCUMENTS

EP      0336477 B1      11/1991

OTHER PUBLICATIONS

Mineral Detection in the Infrared using Reflectance Spectroscopy, Dec. 9, 2013, 1-2, South Africa.

(Continued)

*Primary Examiner* — Mohamed Charioui
*Assistant Examiner* — Catherine Rastovski
(74) *Attorney, Agent, or Firm* — AEON Law, PLLC; Adam L. K. Philipp; Jonathan E. Olson

(57) ABSTRACT

Respective embodiments disclosed herein include methods and apparatuses (1) for surveying a mine bench or other material body using at least seismic data obtained via geophone and measurement module data synchronized via a wireless link; (2) for generating hyperspectral panoramic imaging data of a blast hole or other borehole; or (3) for allowing a neural network to facilitate a differential blast design that targets a first bench part more weakly than the differential blast design targets a second bench part (along the same mine bench) at least partly based on data indicative of a much higher concentration of a valuable material in the second bench part than in the first.

20 Claims, 17 Drawing Sheets

(51) Int. Cl.
*G01V 99/00* (2009.01)
*G01V 1/16* (2006.01)
*G01V 1/18* (2006.01)

(56) References Cited

U.S. PATENT DOCUMENTS

| | | | |
|---|---|---|---|
| 7,911,760 | B2 | 3/2011 | Lownds |
| 8,416,418 | B2 | 4/2013 | Kendall |
| 8,538,698 | B2 | 9/2013 | Heck |
| 8,649,980 | B2 | 2/2014 | Gulati |
| 9,501,740 | B2 | 11/2016 | Hiu et al. |
| 9,618,310 | B2 | 4/2017 | Brent et al. |
| 2005/0171700 | A1 | 8/2005 | Dean |
| 2006/0023105 | A1 | 2/2006 | Kostrzewski et al. |
| 2006/0262480 | A1 | 11/2006 | Stewart |
| 2007/0081091 | A1 | 4/2007 | Pan et al. |
| 2010/0033552 | A1 | 2/2010 | Ogawa |
| 2012/0139325 | A1 | 6/2012 | Norberg et al. |
| 2012/0169841 | A1 | 7/2012 | Chemali et al. |
| 2012/0211649 | A1 | 8/2012 | Hallundæk et al. |
| 2012/0323495 | A1 | 12/2012 | Zhou et al. |
| 2013/0192850 | A1 | 8/2013 | Craik |
| 2013/0318019 | A1 | 11/2013 | Jamison et al. |
| 2014/0083765 | A1 | 3/2014 | Hoult et al. |
| 2014/0119159 | A1 | 5/2014 | Calvez et al. |
| 2014/0136170 | A1 | 5/2014 | Leahy et al. |
| 2014/0343754 | A1 | 11/2014 | Poettker et al. |
| 2015/0006444 | A1 | 1/2015 | Tamatsu et al. |
| 2015/0052092 | A1 | 2/2015 | Tang et al. |
| 2015/0071033 | A1 | 3/2015 | Thompson et al. |
| 2015/0381981 | A1 | 12/2015 | Gelman et al. |
| 2016/0042272 | A1 | 2/2016 | Mohaghegh |
| 2016/0069655 | A1 | 3/2016 | Brent |
| 2016/0091622 | A1* | 3/2016 | Pei .............. G01V 1/28 702/11 |
| 2016/0119159 | A1 | 4/2016 | Zhao et al. |
| 2016/0209195 | A1 | 7/2016 | Kruger et al. |
| 2016/0299091 | A1 | 10/2016 | Bamber et al. |
| 2016/0313107 | A1 | 10/2016 | Birkin et al. |
| 2017/0028443 | A1 | 2/2017 | Bamber et al. |
| 2017/0038188 | A1 | 2/2017 | Handel |
| 2017/0124711 | A1 | 5/2017 | Chandraker et al. |
| 2017/0146452 | A1 | 5/2017 | Ben-Dor et al. |

OTHER PUBLICATIONS

Partha Das Sharma, Measurement While Drilling (MWD) and Image Analysis Systems: Today's Most Useful and Cost-effective Tools for Mining Industry, Jan. 26, 2012, 1-15, India.

S.G. Walters, Driving Productivity by Increasing Feed Quality Through Application of Innovative Grade Engineering® Technologies, Aug. 22, 2016, 3-31, Australia.

Segui, J.B., et al. "Blast Design Using Measurement While Drilling Parameters", Fragblast, 6:3-4, 287-299 (2010).

Poletto, P., et al., "Numerical Modeling and Interpretation of Drillstring Waves", Geophysics, vol. 66, No. 5, pp. 1569-1581 (Sep.-Oct. 2001).

Lutz, J. et al, Instantaneous Logging Based on a Dynamic Theory of Drilling, Journal of Petroleum Technology, Jun. 1972.

* cited by examiner

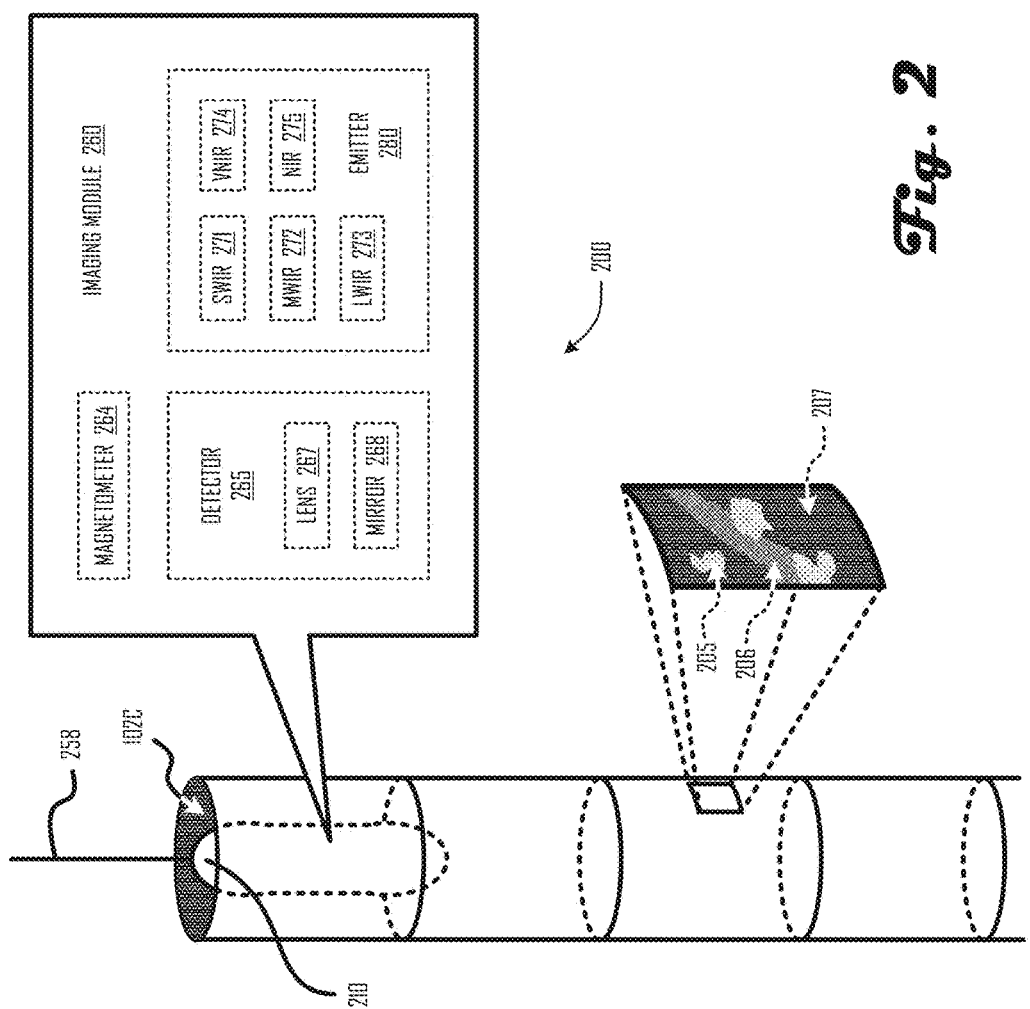

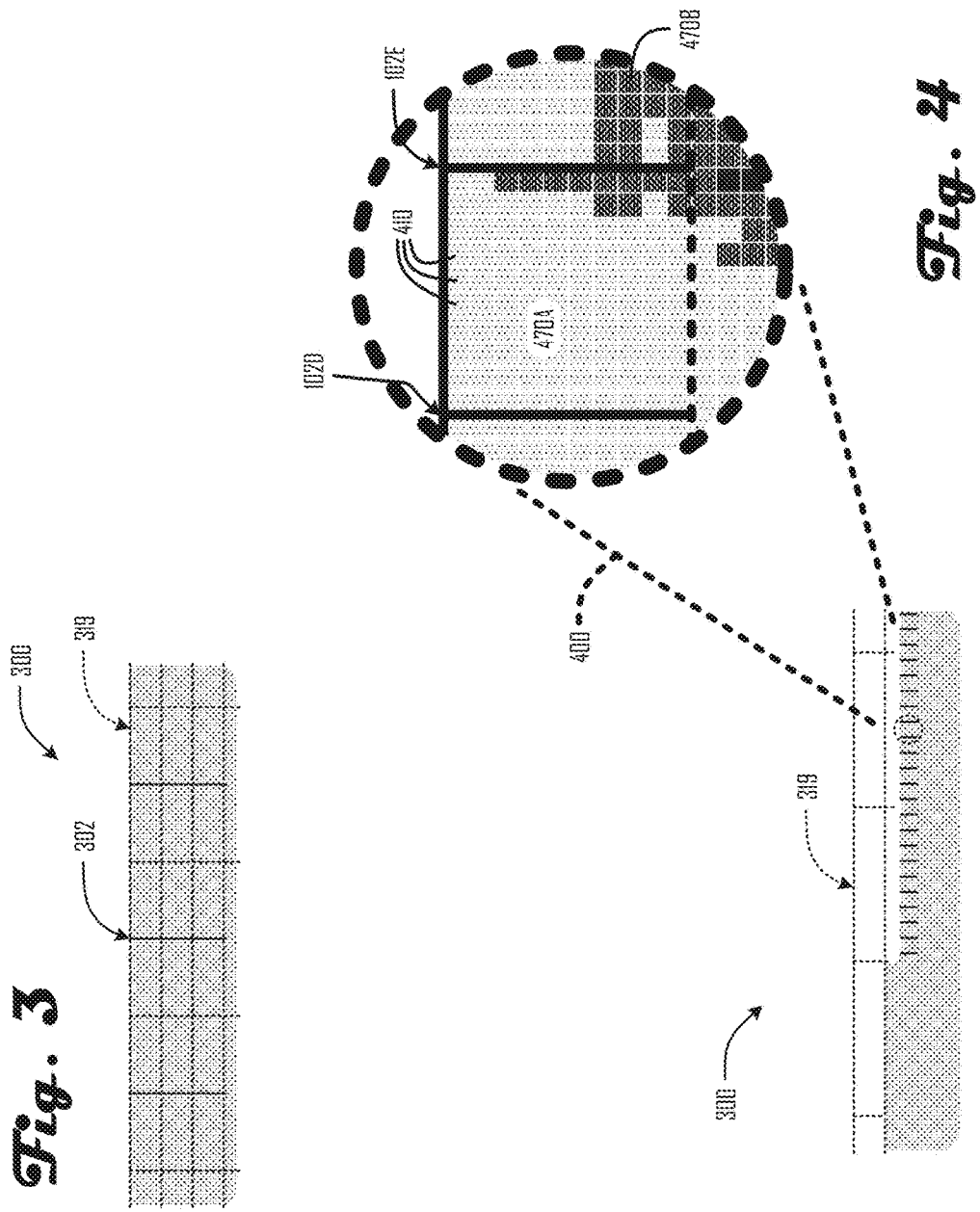

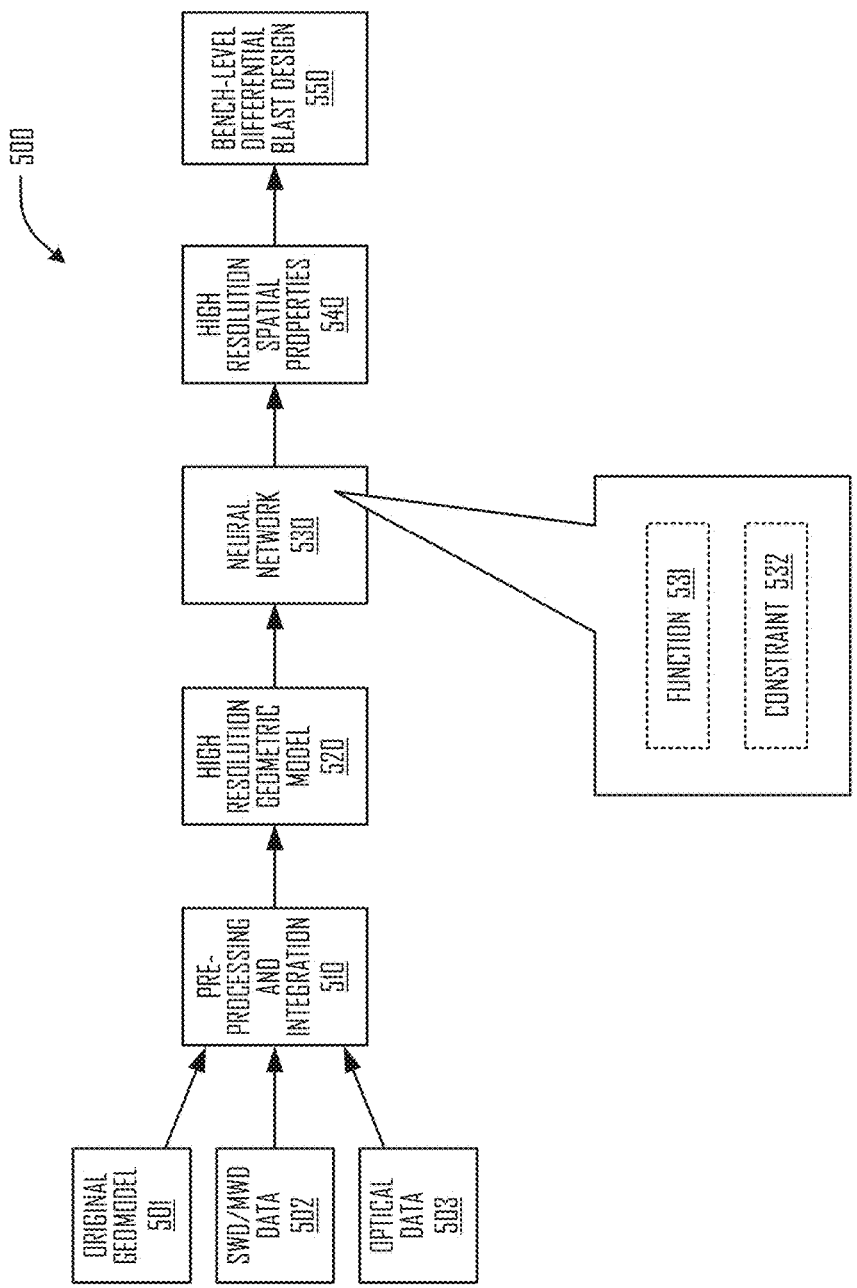

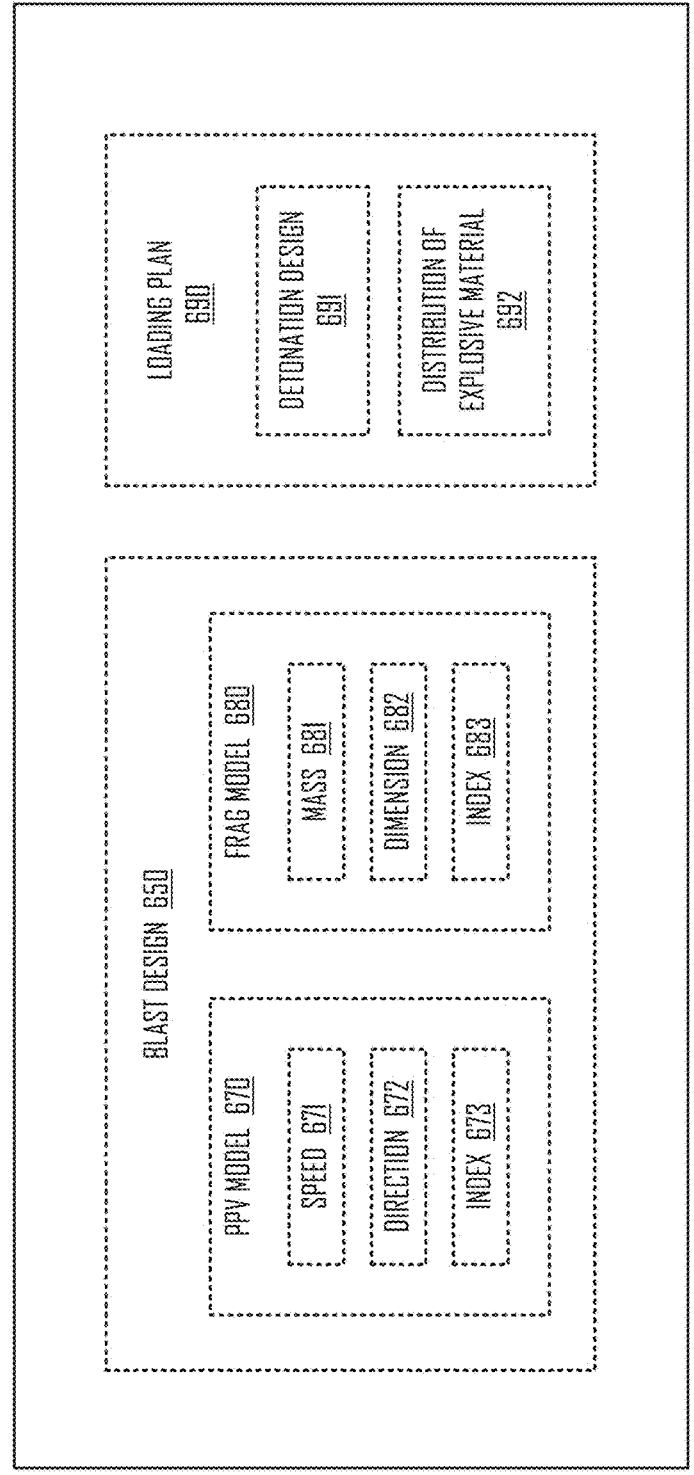

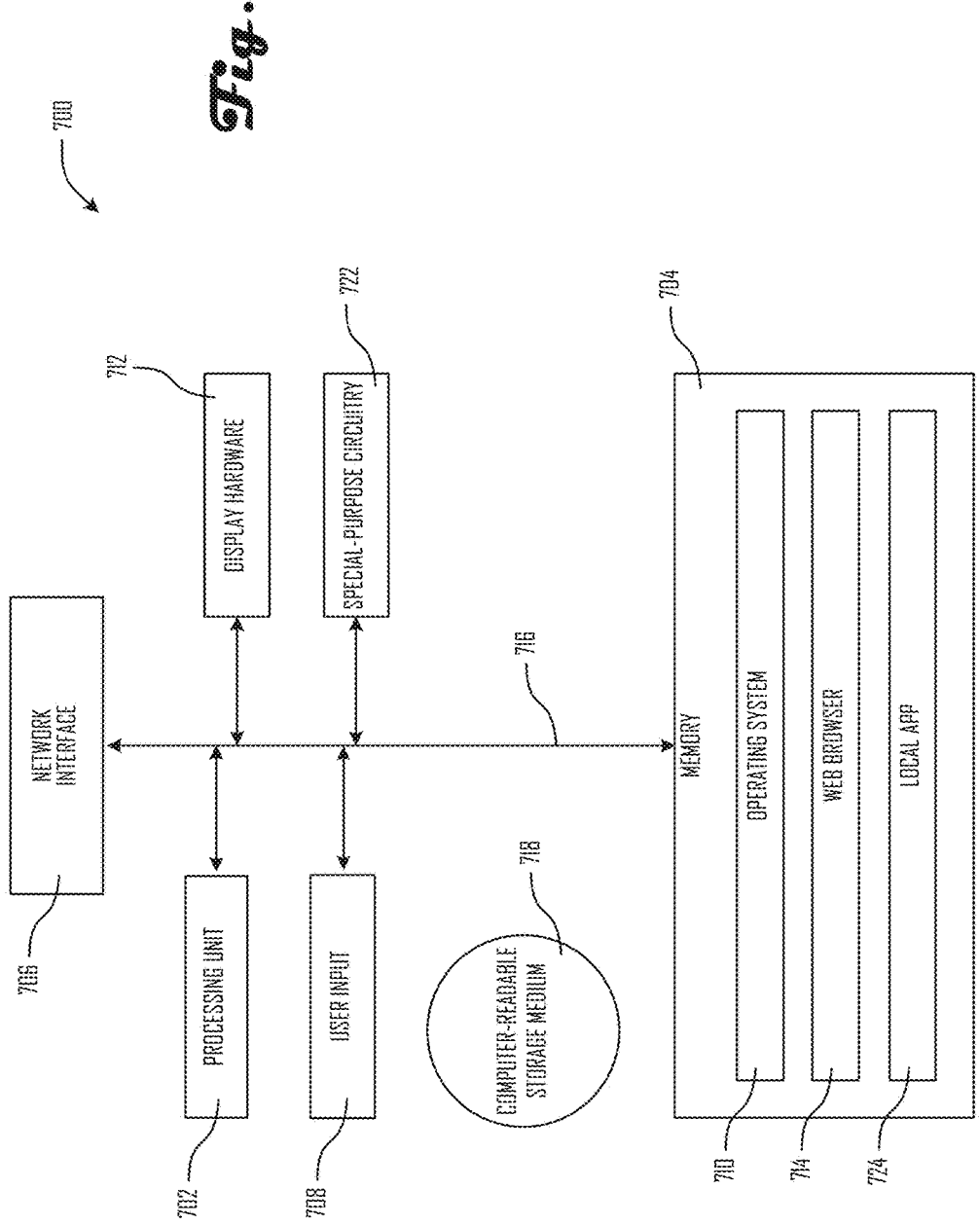

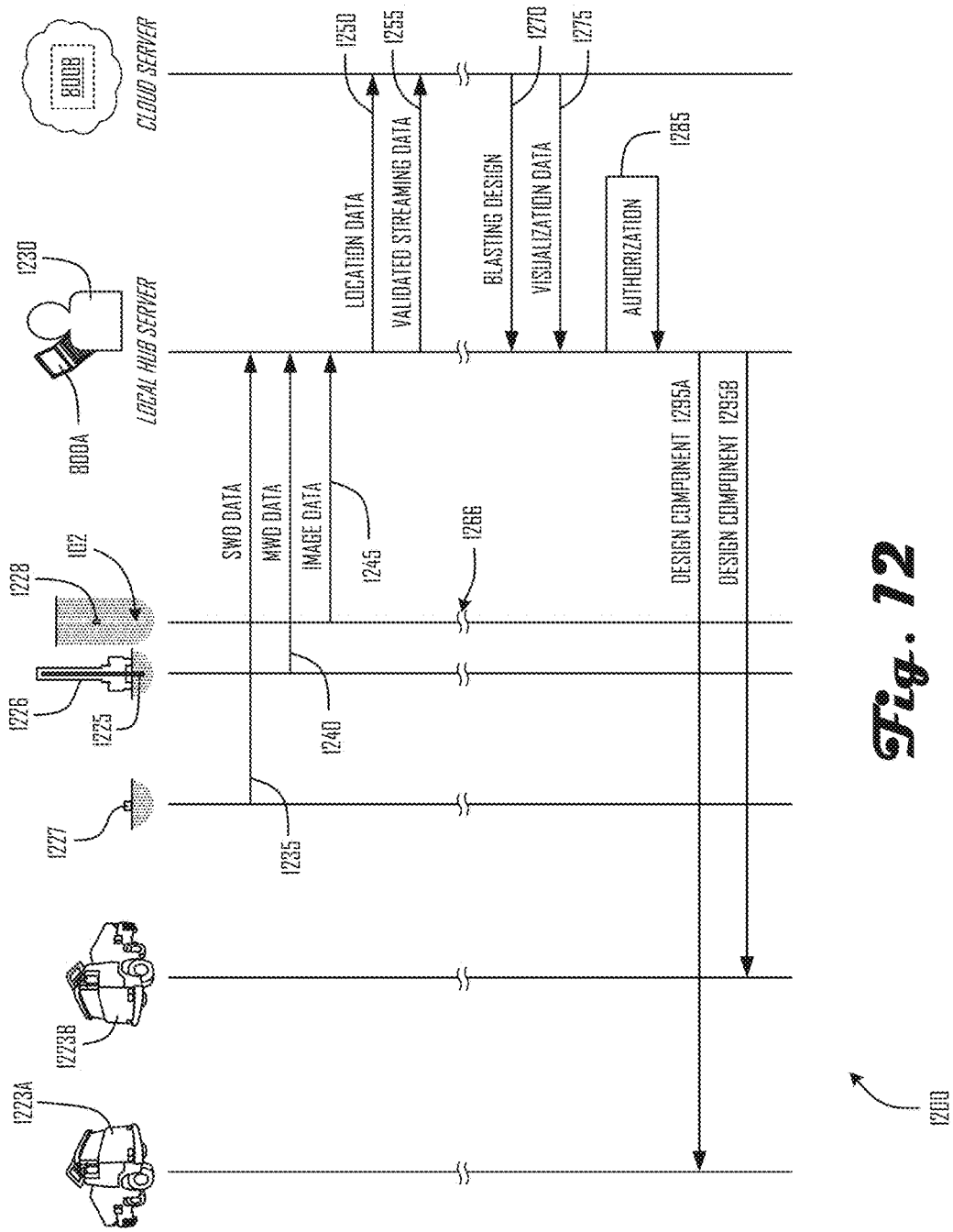

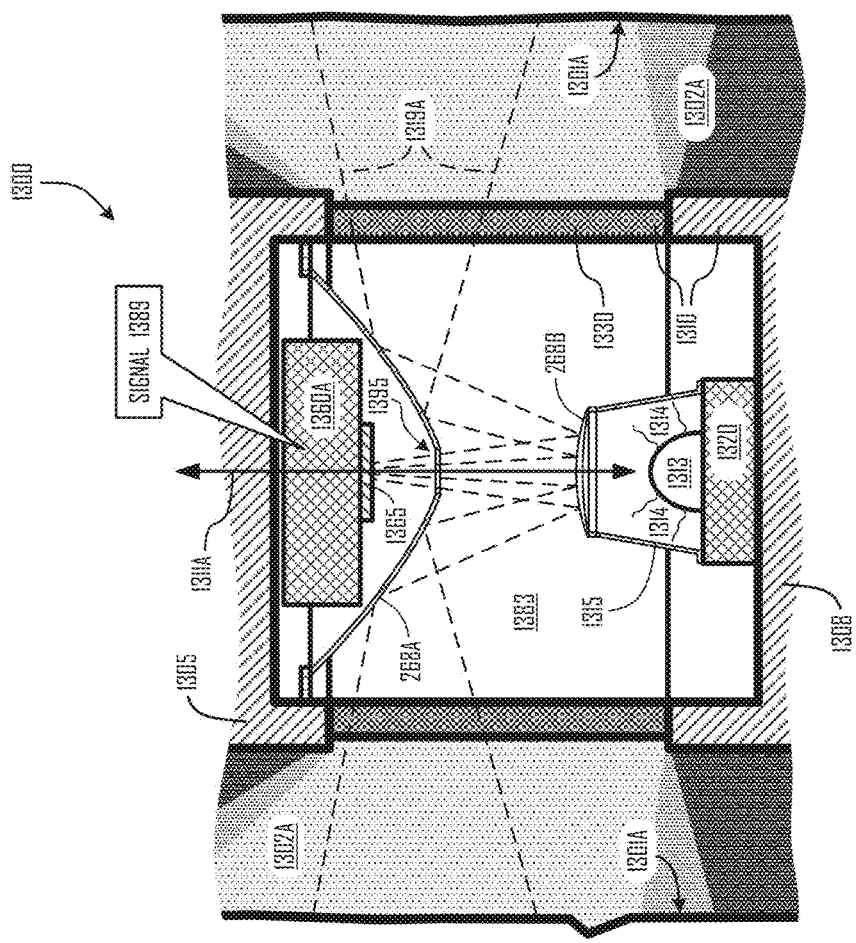

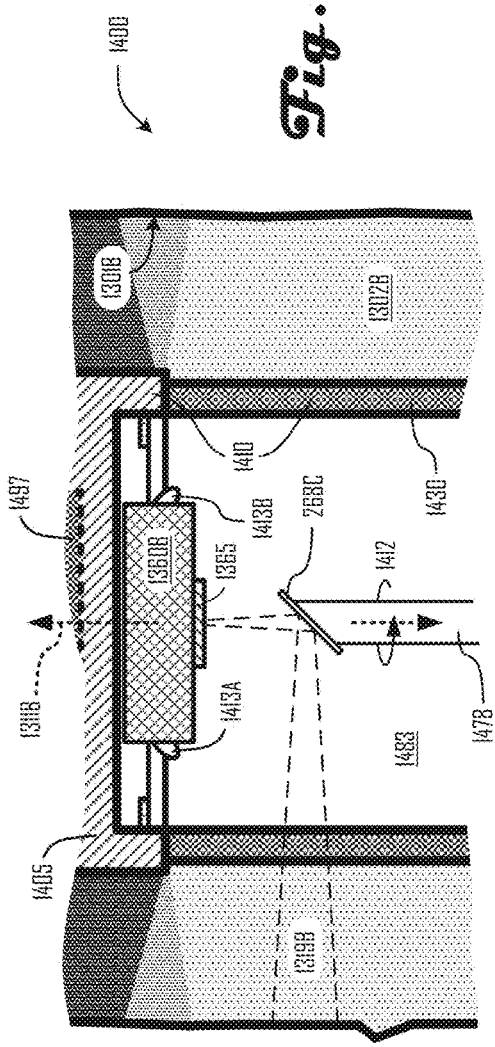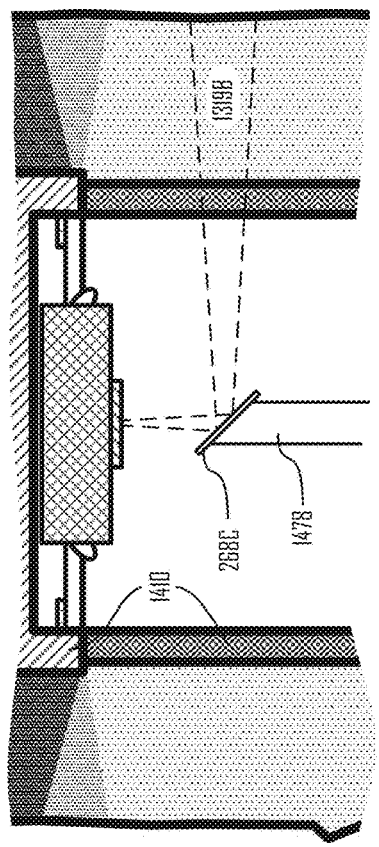

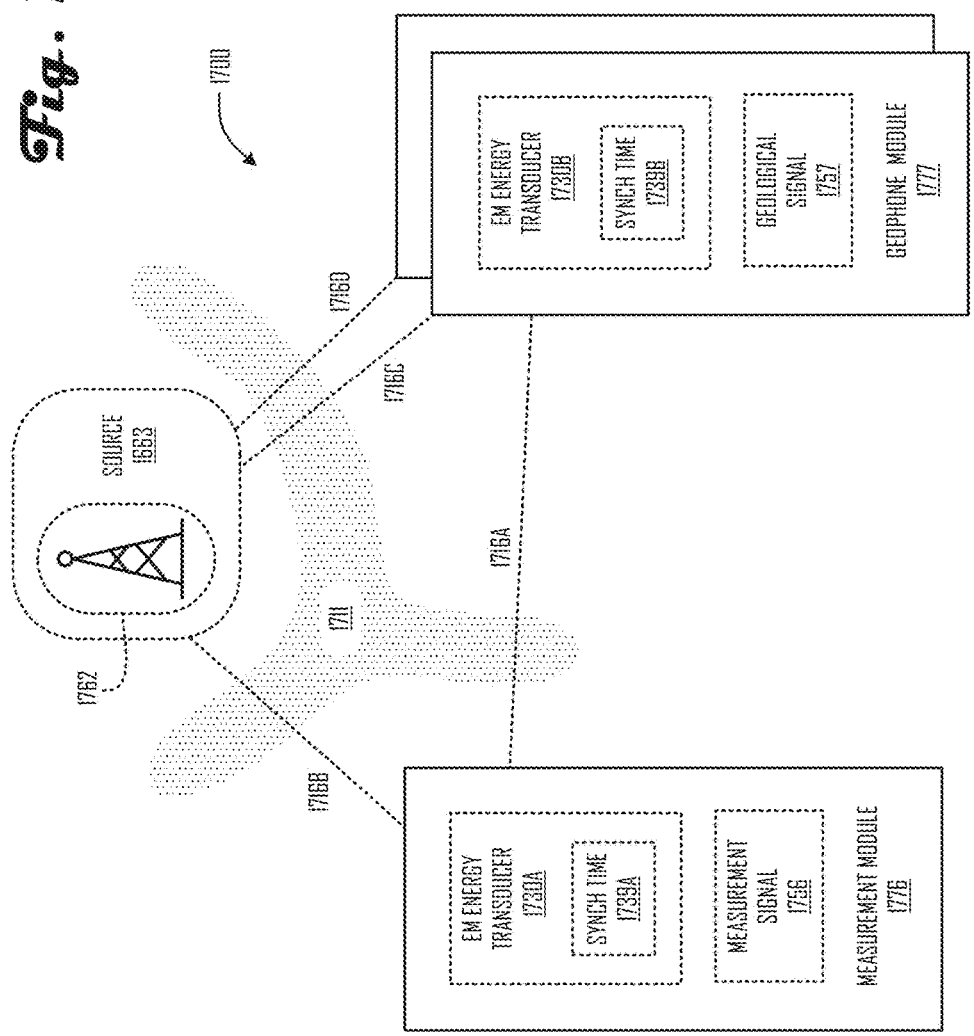

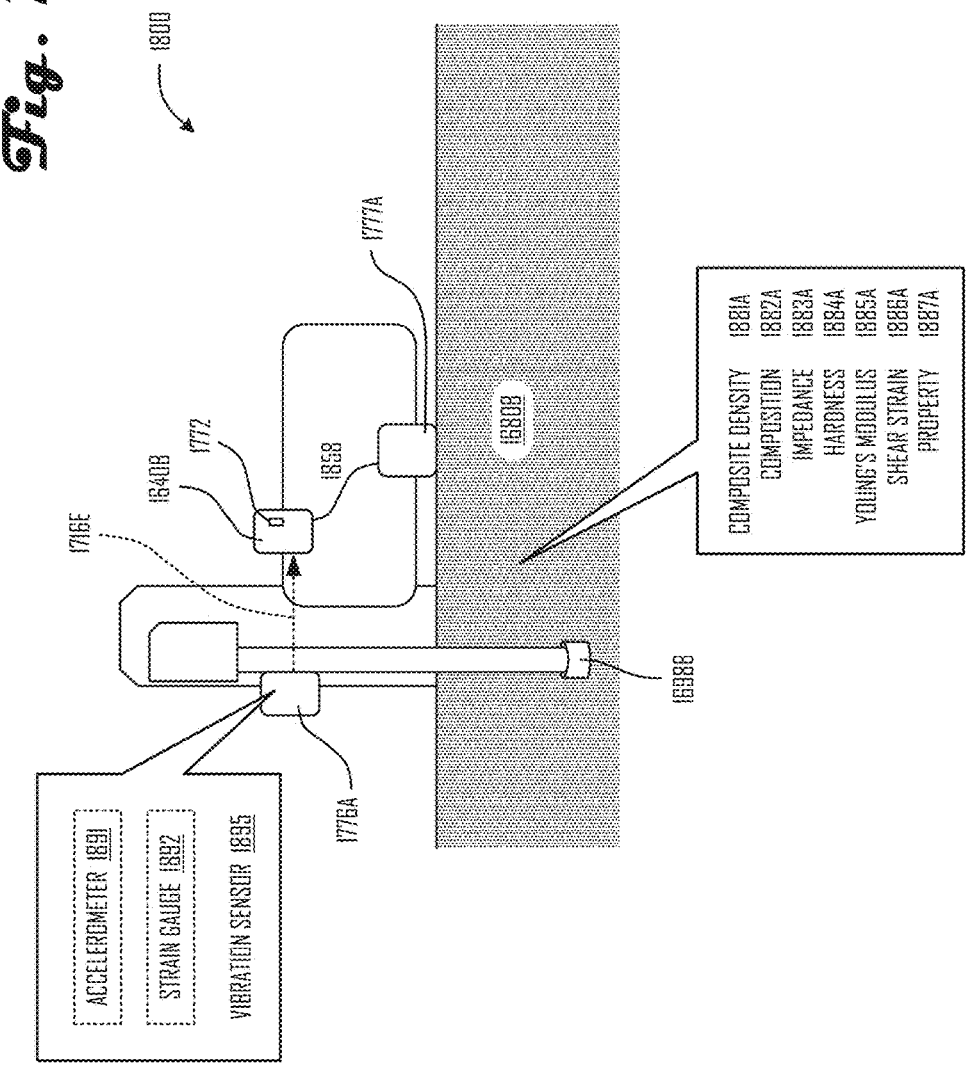

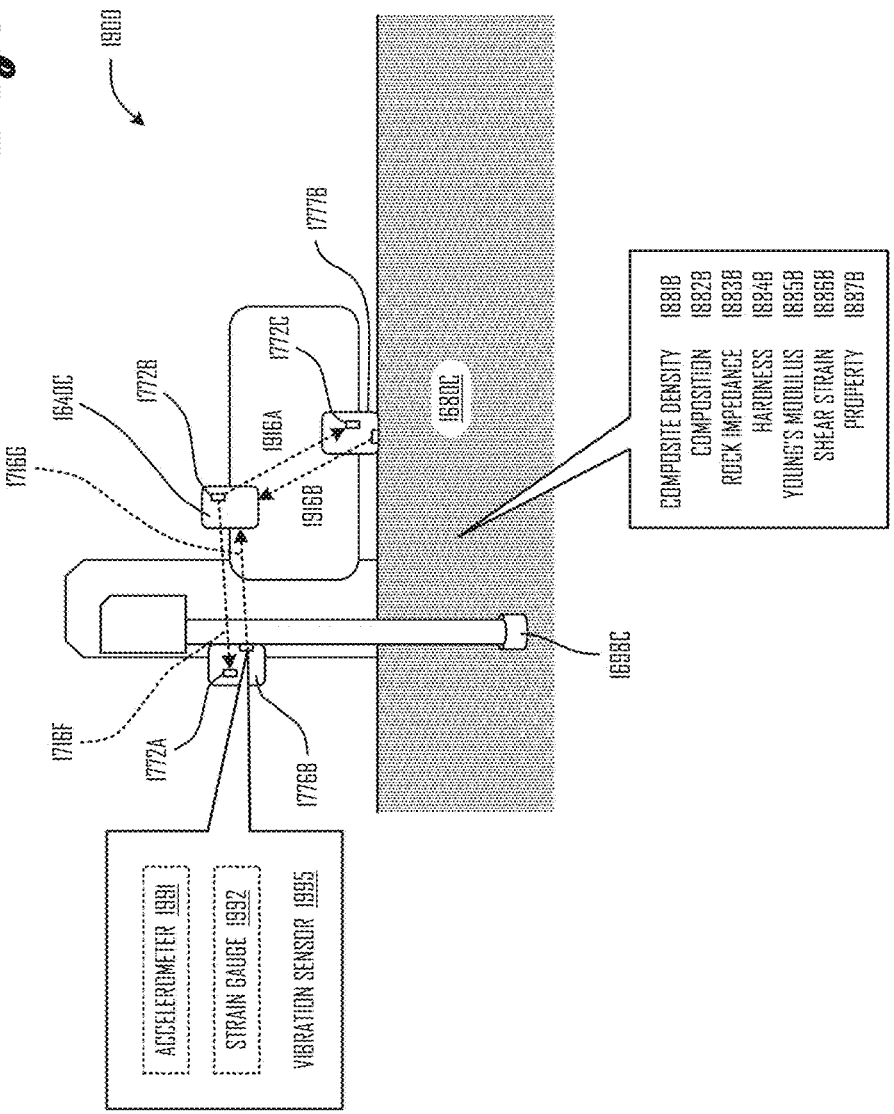

SEISMIC-WHILE-DRILLING SURVEY SYSTEMS AND METHODS

CROSS-REFERENCE TO RELATED APPLICATIONS

None.

BRIEF DESCRIPTION OF THE DRAWINGS

FIG. 2 illustrates an entry of a blast hole into which a borehole probe extends.

FIG. 3 illustrates a vertical cross-section of a quarry.

FIG. 4 illustrates a vertical cross-section of the quarry of FIG. 3 in which some benches have been removed and another bench is being removed.

FIG. 5 illustrates a high-level data flow schematic featuring a neural network in which one or more technologies may be implemented.

FIG. 6 illustrates a medium containing a data arrangement of blast design components.

FIG. 7 illustrates several components of an exemplary client device in which one or more technologies may be implemented.

FIG. 12 illustrates a particular scenario and progressive data flow suitable to illustrate one or more embodiments.

FIGS. 13-15 illustrate borehole imaging systems constructed and arranged to interact with a nominally cylindrical borehole.

FIG. 17 schematically illustrates a surveying system that may exemplify those depicted in FIG. 16.

FIG. 18 schematically illustrates another surveying system that may exemplify those depicted in FIG. 16.

FIG. 19 schematically illustrates another surveying system that may exemplify those depicted in FIG. 16.

DETAILED DESCRIPTION

Figure 1:
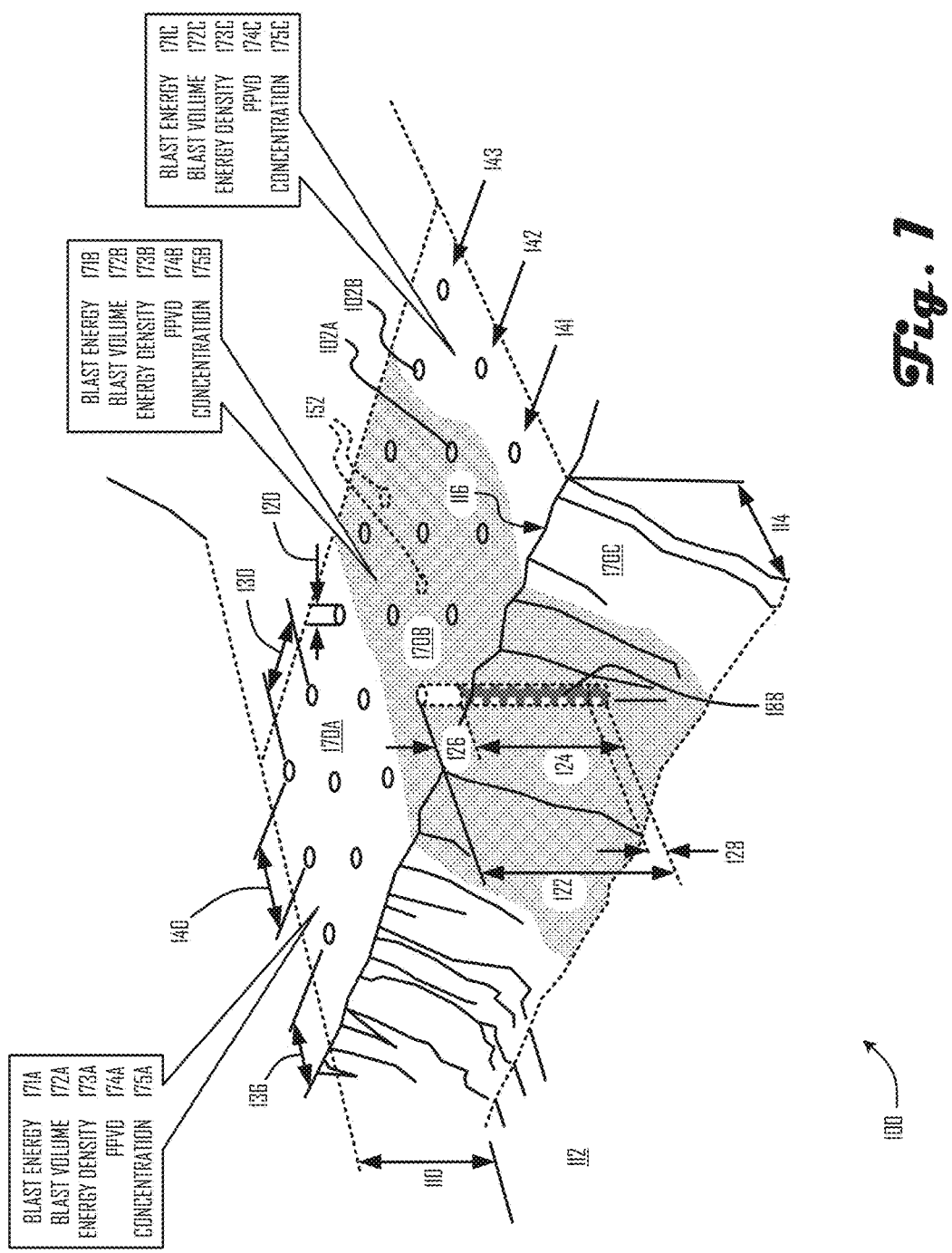
FIG. 1 illustrates a mine bench including many blast holes and in which a target material is expected to be much more prevalent in one bench part than another.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote database servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Apparent," "associated," "at least," "automatic," "based," "better," "between," "broad," "capable," "compatible," "complete," "concentrated," "conditional," "configured," "consecutive," "corresponding," "current," "cylindrical," "each," "existing," "false," "first," "having," "higher," "in," "intermediate," "internal," "local," "lower," "maximum," "minimum," "mobile," "new," "nominal," "numerous," "on," "opaque," "other," "partly," "performed," "proximate," "real-time," "recognized," "remote," "resident," "respective," "responsive," "scalar," "scheduled," "second," "selected," "sequential," "several," "spectral," "target," "tentative," "third," "transparent," "triggered," "while," "with," or other such descriptors herein are used in their normal yes-or-no sense, not as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. As used herein, the term "contemporaneous" refers to circumstances or events that are concurrent or at least roughly contemporaneous (on the same day, e.g.). As used herein, a "marginal" concentration of a mineral is one that falls between a lowest in situ concentration of that mineral deemed high enough (i.e. worthwhile for strip mining) and a highest in situ concentration of that mineral deemed too low (i.e. not worthwhile for strip mining) according to then-applicable industry norms.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates (a portion of) a mine bench 100 (in a perspective view of a strip mine, e.g.) including many blast holes 102 (many of which are arranged in rows 141, 142, 143) and in which a target material (a valuable ore, e.g.) is expected to be much more prevalent in one bench part 170B than in adjacent parts 170A,170C of the same bench 100. A bench height 110 is shown, typically at least 5 meters and at most 15 meters. A bench floor 112 is shown, which will become a final grade if an entirety of bench 100 is removed. A toe 114 of bench 100 is shown, nominally at least 50% and at most 75% relative to the bench height 110. Relative to cutaway borehole is shown a (nominal) blast hole depth 122, an explosive column height 124, a stem height 126, a subdrilling 128 (extending about a meter beyond a nominal bottom of bench 100, as shown), and an explosive material 188 (darkly shaded). In relation to a middle bench part 170B (shaded as shown), one or more instances of a predictedly high concentration 175B of one or more target materials (silver, copper, nickel, gold, or tungsten, e.g.) are shown based upon measurements and modeling as described below. Likewise in relation to another bench part 170A (left of bench part 170B as shown), one or more instances of a predictedly lower concentration 175A of the target material(s) are shown. Likewise in relation to another bench part 170C (right of bench part 170B as shown), one or more instances of another predictedly lower concentration 175C of the target material(s) are shown. Also in relation to bench 100, FIG. 1 shows a crest 116, a (nominal) blast hole diameter 120, a (nominal) longitudinal spacing 130, a (nominal) hole-to-crest width 136 of more than a meter, and an apparent burden 140.

In facilitating a differential blast design that targets some bench parts 170A, 170C more weakly than other bench parts 170B, explosive materials 188 are distributed in the blast holes 102 across all of these parts so that a (nominal aggregate) blast energy 171A per unit volume 172A of the first bench part 170A is significantly less (i.e. by more than 30%) than a corresponding (nominal aggregate) blast energy 171B per unit volume 172B of the second bench part 170B. Likewise a blast energy 171C per unit volume 172C of a third bench part 170C is significantly less (i.e. by more than 30%) than the corresponding blast energy 171B per unit volume 172B of the second bench part 170B. Such lower (volume-averaged nominal) energy densities 173A, 173C may be significantly less that a (volume-averaged nominal) energy density 173B of a target bench part 170B, for example, as a mathematical consequence of peak particle velocity (PPV) distributions 174A, 174C being much lower than a (nominal aggregate predicted) PPV distribution 174B of a target bench part 170B or for other reasons described below. Such higher energy densities 173B and PPV distributions 174B may, for example, be achieved by inserting interstitial blast holes 152 or by using stronger explosives (or both).

FIG. 2 illustrates a top portion of a blast hole 102C into which an imaging module 260 extends, supported by cable 258 (attached to a drill rig as shown in FIG. 12 or to a winch, e.g.) prior to an insertion of explosive material 188. A magnified portion of what an image can capture, as shown, depicts in situ target materials 205, 206 as well as other rock. Depending upon which target materials 205, 206 (valuable minerals, e.g.) are sought, imaging module 260 may (optionally) include one or more instances of short wavelength infrared (SWIR) emitters 271, mid-wavelength infrared (MWIR) emitters 272, long wavelength infrared (LWIR) emitters 273, visible and near-infrared (VNIR) emitters 274, near-infrared (NIR) emitters 275, or other optical emitters 280 (or a combination of these). This can occur, for example, in a context in which imaging module 260 includes no lenses 267, in which detector 265 includes one or more mirrors 268 suitable to facilitate circumferential or other panoramic image capture, and in which light emanating from a borehole wall would otherwise undergo significant undesirable frequency-dependent distortions (due to refraction resulting from passing obliquely through a magnifying lens, e.g.). Alternatively or additionally, imaging module 260 may include a magnetometer 264, clock, GPS receiver, or other indicia of timing or orientation of the captured images. In some variants, moreover, (an instance of) detector 265 may be configured to identify various components of waste rock 207.

As further explained below, a borehole imaging system 200 as described herein may include one or more imaging modules 260 supported by a cable 258, magnetic coupling, drill string, or other adjustable coupling/positioning mechanism. Various configurations (cameras pointing in several directions, e.g.) may allow an entire internal circumference of the blast hole 102C to be depicted with a minimum of distortion. As shown system 200 include a longitudinally oblong housing 210 configured to enter a borehole (a blast hole 102 or exploration borehole, e.g.), one or more light sources (emitters 280, e.g.) supported by the housing and configured to emit light onto an annular portion of the borehole, and an imaging module that includes one or more electro-optical sensors (cameras or other detectors 265, e.g.) configured to convert a reflected portion 1319 of the light into one or more electronic signals. In some contexts the imaging module 260 may further comprise transistor-based circuitry configured to capture panoramic interior image data that depicts the borehole at least partly based on the electronic signal(s).

FIG. 3 illustrates a cross-sectional view of a mine 300 in which several benches are visible with a topmost dashed line signifying an initial grade 319. As shown several exploration holes 302 deeper than 50 meters have been created, but no blast holes 102 yet.

FIG. 4 illustrates a vertical cross-section of the mine 300 of FIG. 3 in which some benches have been removed (i.e. relative to the initial grade 319) and another bench is being removed. A magnified sectional view displays two of the blast holes 102D, 102E in a row (spaced ten meters apart, e.g.). An irregular instance of a first bench part 470A (lightly shaded) is shown adjacent a second bench part 470B (more darkly shaded) in which a target material 205 is (predicted to be) more than twice as concentrated. This warrants a differential blast design that targets the first bench part 470A much more weakly than the second bench part 470B (i.e. by more than 30%). As used herein, a "bench part" refers to an at-least-diagonally adjacent and otherwise substantially contiguous volume greater than 50 cubic meters and that spans at least 20 meters along a bench. For example the differentiated "first" and "second" bench parts can be layers, end-to-end segments, side-by-side segments, or irregularly interfaced as exemplified in FIG. 4. Moreover each bench part may undergo a blast design component with a non-uniform energy density. This can occur, for example, when each portion is modeled as a set of (at least diagonally) adjacent cubes (one cubic meter each, e.g.) at respective positions 410 thereof (as shown in FIG. 4, e.g.) and across which blast pulses will (predictedly) travel during the blast.

FIG. 5 illustrates a high-level data flow schematic featuring several data sources: a combination of an original geomodel 501 with optical data 503, and optionally including SWD/MWD data 502 (or both). Data from each of these sources undergoes respective component protocols of preprocessing and integration 510 so as to create a high resolution geometric model 520. Neural network 530 (optionally implemented as a cloud-based convolutional neural network) applies one or more yield-related cost functions 531 or other constraints 532 (relating to time and materials used in extraction, e.g.) so as to define high resolution spatial properties 540 defining, for example, boundaries of bench parts 170, 470 subject to the resulting bench-level differential blast design 550.

FIG. 6 illustrates a one or more nonvolatile storage media 600 containing a data arrangement of blast design components. In some contexts, for example, a differential blast design 650 as described herein may include (desired) component PPV models 670 or fragmentation models 680 (or both) for each affected bench part. This can occur, for example, in a context in which each PPV model 670 defines a speed 671 and direction 672 for each respective position 410 within the bench part as well as an uncertainty index 673 (variance or confidence interval, e.g.) quantifying an uncertainty in regard to that speed 671 and direction 672. Likewise each fragmentation model 680 may define a predicted mass 681 or a (respective maximum linear) dimension 682 for a respective inventory of post-blast fragments originating within the bench part as well as an uncertainty index 683 quantifying an uncertainty (a standard deviation or other suitable statistical measure, e.g.) in regard to those distributions of mass 681 or linear dimension 682 (or both). Alternatively or additionally a loading plan 690 may express a candidate blast design by articulating a detonation design 691 (defining a type and timing of detonation, e.g.) and a distribution of explosive material 692 targeting each respective bench part (by expressing an aggregate blast energy density 173 across the bench part, e.g.) as a function of time and XYZ position (latitude, longitude, and altitude, e.g.).

FIG. 7 illustrates several components of an exemplary client device 700 (an imaging module 260 or other intelligent peripheral, e.g.). In some embodiments, client device 700 may include many more components than those shown in FIG. 7 (an accelerometer configured to implement a geophone, e.g.). However, it is not necessary that all conventional components be shown in order to disclose an illustrative embodiment. As shown in FIG. 7, client device 700 includes a data network interface 706 (for connecting via the Internet or other networks to or to mobile manufacturing units or other smart devices as described herein, e.g.).

Client device 700 may also include one or more instances of processing units 702, memory 704, user inputs 708, and display hardware 712 all interconnected along with the network interface 706 via a bus 716. Memory 704 generally comprises a random access memory ("RAM"), a read only memory ("ROM"), and a permanent mass storage device, such as a disk drive.

Memory 704 may likewise contain one or more instances of operating systems 710, web browsers 714, and local apps 724. These and other software components may be loaded from a non-transitory computer readable storage medium 718 into memory 704 of the client device 700 using a drive mechanism (not shown) associated with a non-transitory computer readable storage medium 718, such as a floppy disc, tape, DVD/CD-ROM drive, flash card, memory card, or the like. In some embodiments, software components may also be loaded via the network interface 706, rather than via a computer readable storage medium 718. Special-purpose circuitry 722 may, in some variants, include some or all of the event-sequencing logic described herein (including transistor-based circuitry within an imaging module 260 configured to capture interior image data that depicts a borehole as described herein, e.g.).

Figure 8:
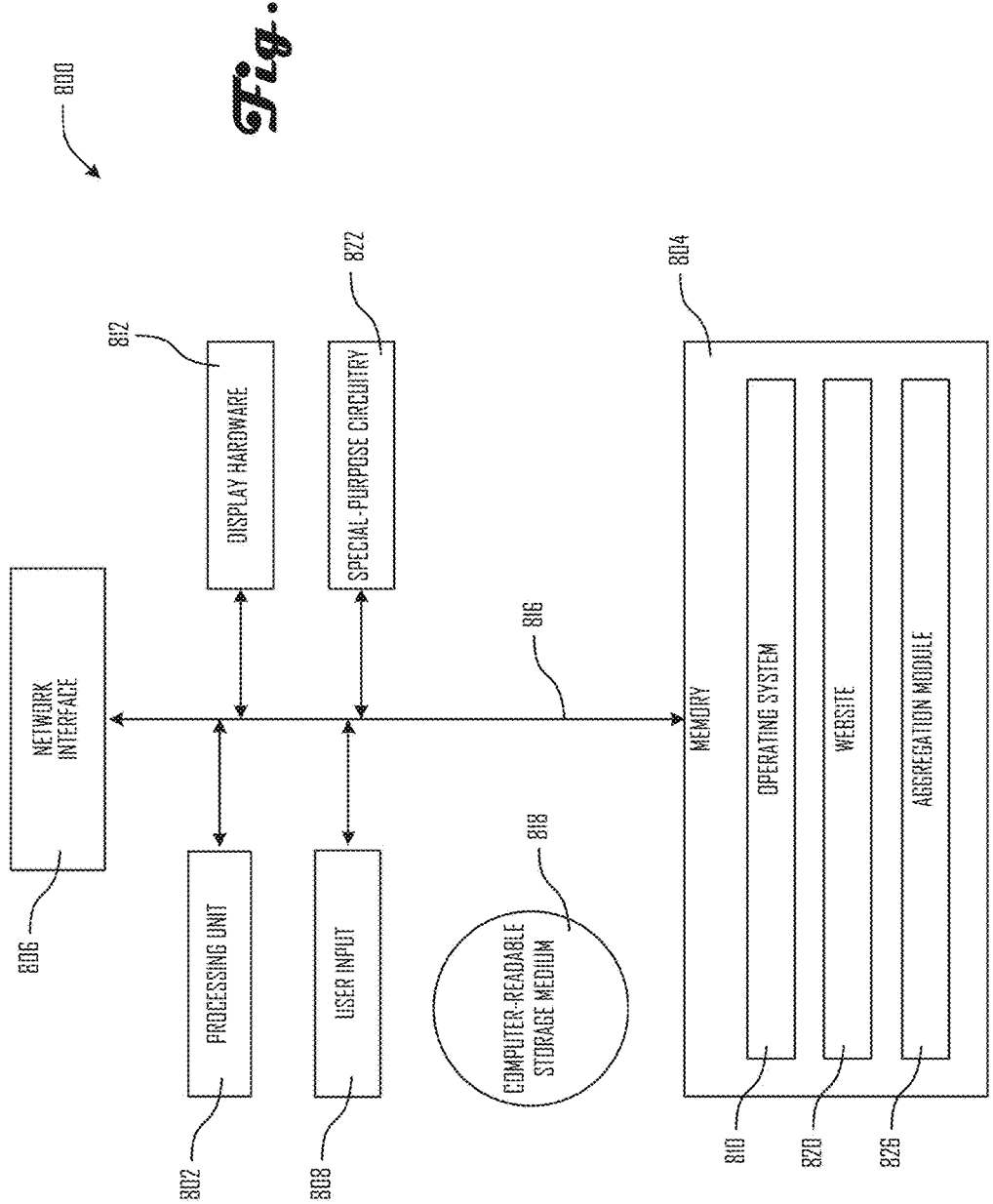
FIG. 8 illustrates several components of an exemplary server in which one or more technologies may be implemented.

FIG. 8 illustrates several components of an exemplary server 800. As shown in FIG. 8, server 800 includes a data network interface 806 for connecting via the Internet or other networks (or both). As used herein, a plain reference numeral (like 800, e.g.) may refer generally to a member of a class of items (like client devices, e.g.) exemplified with a hybrid numeral (like 800A, e.g.) and it will be understood that every item identified with a hybrid numeral is also an exemplar of the class.

Server 800 may also include one or more instances of processing units 802, memory 804, user inputs 808, and display hardware 812 all interconnected along with the network interface 806 via a bus 816. Memory 804 generally comprises a random access memory ("RAM"), a read only memory ("ROM"), and a permanent mass storage device, such as a disk drive.

Memory 804 may likewise contain an operating system 810, hosted website 820, and aggregation module 826. These and other software components may be loaded from a non-transitory computer readable storage medium 818 into memory 804 of the server 800 using a drive mechanism (not shown) associated with a non-transitory computer readable storage medium 818, such as a floppy disc, tape, DVD/CD-ROM drive, flash card, memory card, or the like. In some embodiments, software components may also be loaded via the network interface 806, rather than via a computer readable storage medium 818. Special-purpose circuitry 822 may, in some variants, include some or all of the event-sequencing logic described below.

Figure 9:
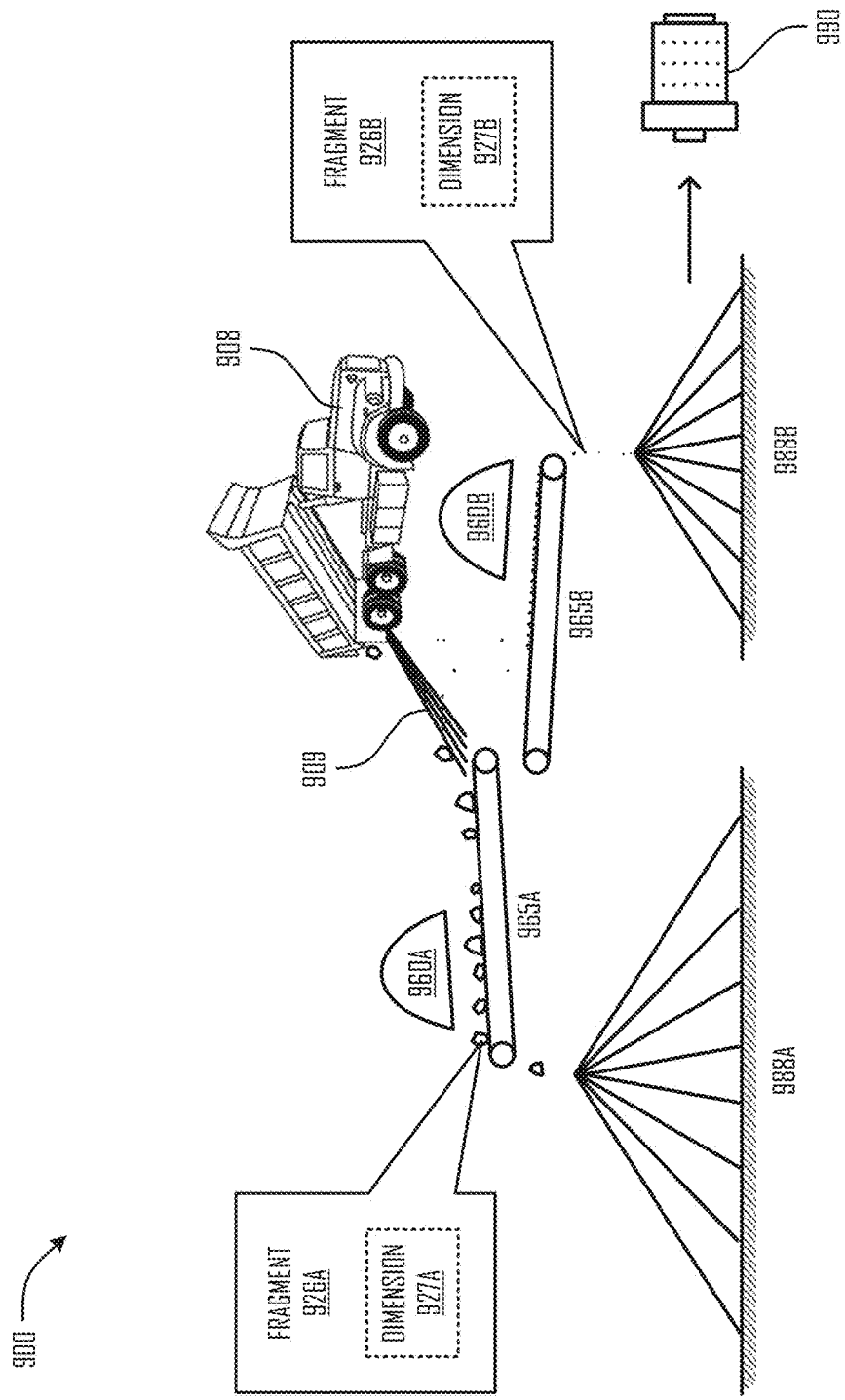
FIG. 9 illustrates a mined material processing facility in which one or more technologies may be implemented.

FIG. 9 illustrates a mined material processing facility 900 in which one or more technologies may be implemented. As shown, heavy material-handling equipment (a dumptruck 908, e.g.) is dumping a mix of large and small fragments 926 that may have undergone a differential blast design implementation if appropriate (to preprocess very-differently-valued material in a single vetted bench-blast, e.g.) so that sieve 909 is thereafter deemed a sufficiently trustworthy instrument for deciding which material will get any further processing. Large fragments 926A excluded by sieve 909 (most material thereof by mass consisting of fragments each having an average longest linear dimension 927A greater than one meter, e.g.) pass onto heavy conveyor 965A. After passing by monitoring equipment 960A (including one or more detectors 265 and hyperspectral emitters 280 as described above, e.g.) and possible sampling as a quality assurance protocol, such fragments 926A finally come to rest on a coarse stockpile 988A (and get no further foreseeable processing).

Small fragments 926B that pass through sieve 909 (most material thereof by mass consisting of thousands of fragments or more, each fragment having a longest linear dimension 927B less than one meter, e.g.) pass onto conveyor 965B. After passing under monitoring equipment 960B (including one or more detectors 265 and hyperspectral emitters 280 as described above, e.g.) and possible sampling as a rapid feedback protocol, such gravel or other fragments 926B arrive at a fine stockpile 988B where they await further treatment (in crushing/grinding equipment 990, e.g.). This can occur, for example, in a context in which such monitoring equipment 960 (configured to indicate yield, precision, or other such cost-indicative metrics) is useful for ongoing system performance enhancements (of pre-processing and integration 510 or neural network 530, e.g.) and in which a lot more material in the coarse stockpile 988A would otherwise need significant further processing.

Figure 10:
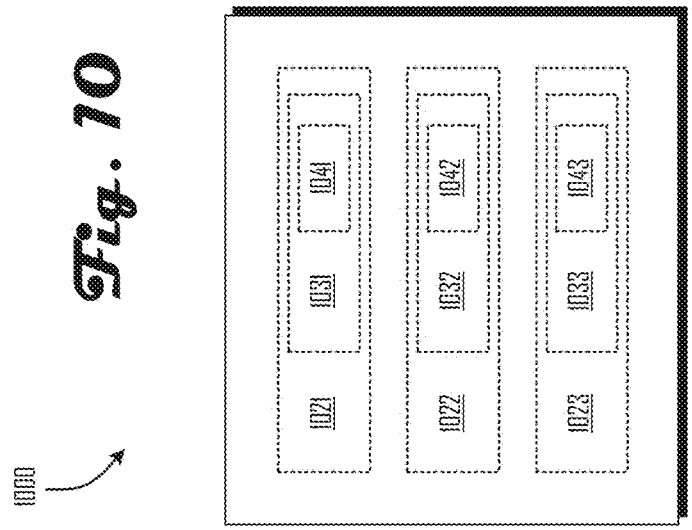
FIG. 10 illustrates a special-purpose event-sequencing structure of one or embodiments.

FIG. 10 illustrates special-purpose transistor-based circuitry 1000—optionally implemented as an Application-Specific Integrated Circuit (ASIC), e.g.—in which some or all of the functional modules described below may be implemented. Transistor-based circuitry 1000 is an event-sequencing structure generally as described in U.S. Pat. Pub.

No. 2015/00104046 but configured as described herein. Transistor-based circuitry 1000 may include one or more instances of modules 1021-1023 configured for local processing, for example, each including an electrical node set 1031-1033 upon which informational data is represented digitally as a corresponding voltage configuration 1041-1043. In some variants, moreover, an instance of modules 1021-1023 may be configured for invoking such processing modules remotely in a distributed implementation.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any determinations or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Figure 11:
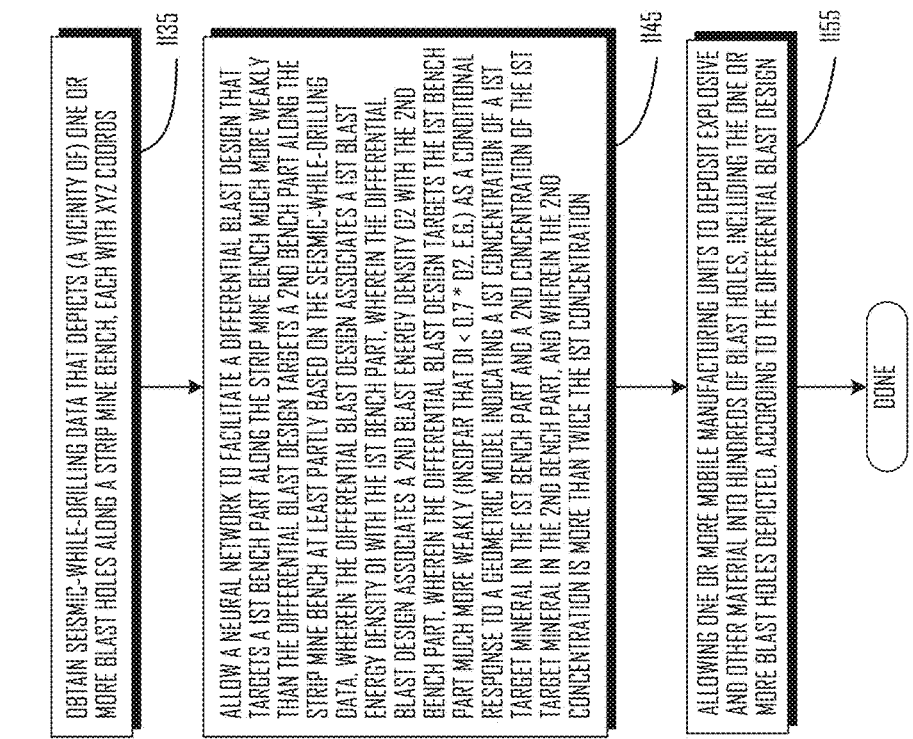
FIG. 11 illustrates a flow that depicts a computer-implemented method of one or embodiments.

FIG. 11 illustrates an operational flow 1100 in which one or more technologies may be implemented (within or in conjunction with one or more servers 800, e.g.). At operation 1135, seismic-while-drilling data is obtained in conjunction with one or more blast holes at known locations (one or more invocation or processing modules 1021 of special-purpose circuitry 822 distilling transmission-delay-indicative data at known bench portions in a vicinity of each blast hole 102 from the geophone data taken in each given bench position, e.g.). This can occur, for example, in a context in which voltage configuration 1041 manifests the XYZ coordinates (including an angular position) of each blast hole 102 in sequence the seismic-while-drilling data is associated.

At operation 1145, a neural network is allowed to facilitate a differential blast design as a conditional response to the seismic-while-drilling data indicating a geometric model indicating the high and low concentrations (one or more invocation or processing modules 1022 of special-purpose circuitry 822 implementing a neural network 530 that effectively determines that an estimated concentration 175B a precious mineral in bench part 170B is high enough to warrant a significantly greater aggregate energy density 173B than that which will be used for other bench parts 170C with a much lower concentration 175C, e.g.). This can occur, for example, in a context in which voltage configuration 1042 manifests a Boolean indication that the target mineral concentration 175B is apparently high enough in absolute terms (above a user-provided threshold as a design constraint 532, e.g.) that bench part 170B should not be treated as overburden and in which the greater energy density 173B is implemented by the addition of a plurality of interstitial blast holes 152 being added selectively after-the-fact to bench part 170B. Alternatively or additionally, the greater energy density 173B may be implemented by one or more an updated differential blast design 650 that calls for one or more particular blast holes 102 in bench part 170B. For example, some or all of the ammonium nitrate-fuel oil ("ANFO") previously specified in a loading plan 690 may be selectively upgraded to heavy ANFO in selected blast holes 102. As used herein, to "facilitate" a differential blast design means either (1) to derive a blast design or loading plan (or both) explicitly or (2) to provide a geometric model estimating a location of a boundary between geological features (a fault, e.g.) that warrants such differential blasting (signaling a large mineral concentration gradient, e.g.).

At operation 1155, one or more mobile manufacturing units (MMU's) are allowed to deposit explosives according to the differential blast design resulting from the difference in concentrations 175 (one or more invocation or processing modules 1023 of special-purpose circuitry 822 authorizing one or more MMU's to implement the updated differential blast design 650, e.g.). This can occur, for example, in a context in which voltage configuration 1043 manifests a Boolean indication that a user has authorized the change in light of visualization data (depicting a concentration or a Young's modulus or shear coefficient distribution, e.g.) provided by neural network 530 to support the update. See FIG. 12.

FIG. 12 illustrates a particular scenario and progressive data flow 1200 in which one or more local hub servers 800A (each operated by a user 1230) is operably coupled with one or more cloud servers 800B as well as MMU's 1223, drill rigs 1226, geophones 1227 or other data-handling client devices 700 onsite (at a quarry 300 or other processing facility 900, e.g.). In some contexts local hub server 800A may aggregate and pre-process (by data extraction or compression, e.g.) seismic-while-drilling data 1235 from several geophones 1227 mounted on or near a material body (a mine bench 100, e.g.) while drill rig 1226 advances drill 1225 down into each blast hole 102 in succession. Alternatively or additionally local hub server 800A may likewise handle measurement-while-drilling data 1240 (from sensors mounted on drill 1225, rig 1226, or other equipment) generated while drill rig 1226 advances drill 1225 down into a current blast hole 102. After each such blast hole 102 is drilled and in appropriate circumstances, a photographic apparatus 1228 is lowered into the hole and (panoramic or other) interior image data 1245 is obtained and provided to local hub server 800A.

Location data 1250 (defining a location of each measurement point, e.g.) is uploaded to cloud server 800B along with validated streaming data 1255 to which it corresponds. After a delay 1266 (but preferably within 24 hours of a completion of the upload corresponding to a current material body being surveyed) a blasting design 1270 is provided along with supporting visualization data 1275 by which user 1230 can evaluate the design. In some contexts (in which an entire bench is overburden, e.g.) no differential blasting design 650 will be warranted. In others a differential blasting design 650 will be determined (to local hub server 800A, e.g.) that targets one bench part much more weakly than it targets another bench part. This might mean, for example, that an ordinary bench part 170A receives a common explosive (ANFO, e.g.) and that an apparently valuable bench part 170B (along a fault, e.g.) receives a premium explosive (heavy ANFO, e.g.) or a higher volume of explosives (in interstitial holes 152, e.g.) or a higher concentration (with less filler, e.g.). But in either case (after an authorization 1285 from user 1230) respective blast design components 1295A-B are provided to their corresponding MMU's 1223A-B and appropriate detonators are installed.

FIG. 13 illustrates a borehole imaging system 1300 (in cross-section) as a longitudinal segment of a probe within a borehole 1302A (a blast hole 102, e.g.). One or more light sources 1313 supported by a housing 1310 are configured to emit light 1314 onto a side wall 1301A of the borehole 1302A. At least two mirrors 268A-B configured to redirect (by successive reflection, e.g.) a reflected portion 1319 of the light incident from the illuminated side wall 1301A of the borehole 1302A. An imaging module 1360A that includes one or more electro-optical sensors 1365 configured to convert a reflected portion 1319A of the light redirected (by the mirrors, e.g.) and converted into a first electronic signal 1389 (as a component of image data 1245, a sensed digital signal photographically depicting the side wall of the borehole, e.g.).

In some variants imaging module 1360A further comprises transistor-based circuitry (as a component of special-purpose circuitry 722, e.g.) configured to obtain panoramic interior image data 1245 that depicts the borehole 1302A at least partly based on the first electronic signal 1389 from the one or more electro-optical sensors 1365. This can occur, for example, in a context in which the one or mirrors 268 include a portion of a (conical-parabolic or other) conical mirror 268A and in which the one or more electro-optical sensors 1365 comprise an axially-directed camera (pointing generally upward or downward along axis 1311A, e.g.) configured to capture an image of the side wall 1301 of the borehole by receiving light redirected from the portion of the conical mirror 268A with substantially no refractive distortion (due to not passing through a magnification/reduction lens, e.g.). Alternatively or additionally, the one or more light sources 1313 may comprise a diffuse-light emitter 280 (implemented by passing incandescent light 1314 through a frosted filter 1315, e.g.).

A first mirror 268A having a central aperture 1395 may be disposed within interior chamber 1383. Central aperture 1395 may be aligned (generally along an axis 1311A of the borehole 1302 or housing 1310, e.g.) with electro-optical sensor 1365. Housing 1310 may include one or more generally opaque end portions 1305, 1308 and an annular sidewall 1330 adjacent to them that is (nominally) transparent so as to facilitate clear imaging of the rocky side wall 1301A of the borehole 1302A. First mirror 268A may comprise a generally conical reflective surface having a central aperture 1395 nominally aligned with a second mirror 268B, optionally with a fully convex reflective surface arranged to redirect a reflected portion 1319A of light reflected by side wall 1301A (so as to depict a larger area of side wall 1301 by providing a field-of-view reduction of 10× or more, e.g.).

A lighting apparatus may include a base 1320 supporting one or more light sources 1313 (one or more incandescent bulbs or light emitting diodes at either end of the apparatus, e.g.). In some variants, light source 1313 may be controlled by image capture apparatus (imaging module 1360, e.g.). A second mirror 268B may comprise a convex reflective surface (having a principal axis that is) generally aligned with that of aperture 1395 and electro-optical sensor(s) 1365.

After a borehole imaging system 1300 is lowered into cylindrical borehole 1302A, a light source 1313 may be activated, causing electromagnetic radiation 1314 to emanate from the light source and travel through transparent side wall 1330 and contact a rocky annular surface (side wall 1301, e.g.) of the borehole 1302. The frequencies of electromagnetic radiation emanating from the light source may include one or more frequencies corresponding to IR (as exemplified in FIG. 2, e.g.), visible light, or ultraviolet light (or combinations of these, in some variants).

Depending on the material composition of side wall 1301, radiation corresponding to some of the emanated frequencies (not shown) will be absorbed by the borehole side wall and other radiation (a reflected portion 1319, e.g.) corresponding to others of the emanated frequencies (indicated by dotted lines) will be reflected by the borehole side wall 1301. It will be appreciated by those skilled in the art that the various frequencies of electromagnetic radiation that are respectively reflected or absorbed frequencies at any given portion of the borehole's annular inner surface are often indicative of concentrations of colorimetrically distinguishable materials of that area. See FIG. 2.

Some of the reflected electromagnetic radiation will travel through transparent side wall 1330, reflect off (a reflective surface of) first mirror 268A, reflect off (a reflective surface of) second mirror 268B, then travel through a central aperture 1395 of the first mirror and be absorbed by electro-optical sensor 1365 of (image capture circuitry of) borehole imaging system 1300. As borehole imaging system 1300 is lowered further into borehole 1302A, reflected or fluoresced frequencies of light radiation may be converted to image data by one or more electro-optical sensors 1365 (appropriately configured cameras, e.g.). In a variant in which imaging system 1300 exemplifies a client device 700, the image data (as signal 1389, e.g.) may be processed by a processing unit 702, stored in memory 704, and/or transmitted by wireless transceiver to a server 800 in order to generate a digital representation of the material composition of (the annular surface of) side wall 1301A.

FIG. 14 illustrates a longitudinal segment of a borehole imaging system 1400 (in cross-section) comprising a housing 1410 within a borehole 1302B (blast hole 102, e.g.). One or more light sources 1313A-B supported by the housing 1410 are configured to emit light 1314 onto a side wall 1301B of the borehole 1302B. Housing 1410 may include one or more generally opaque end portions 1405 and sidewall 1430 adjacent thereto that is (nominally) transparent so as to facilitate clear imaging of the rocky side wall 1301B of the borehole 1302B. At least one mirror 268C is configured to redirect a reflected portion 1319B of the light incident from the side wall 1301B of the borehole 1302B (having passed through transparent sidewall 1430, e.g.). An imaging module 1360B that includes one or more electro-optical sensors 1493 configured to convert a reflected portion 1319B of the light (redirected by mirror 268C, e.g.) into a first electronic signal 1389 (as a component of image data 1245, a sensed digital signal depicting the side wall of the borehole, e.g.).

In some variants imaging module 1360B further comprises transistor-based circuitry (as a component of special-purpose circuitry 722, e.g.) configured to obtain panoramic interior image data 1245 that depicts the borehole 1302B at least partly based on the first electronic signal 1389 from the one or more electro-optical sensors 1493. This can occur, for example, in a context in which the one or more electro-optical sensors 1493 comprise an axially-directed camera (pointing generally upward or downward along axis 1311B, e.g.) configured to capture an image of the side wall 1301B of the borehole 1302B by receiving reflected light redirected from the portion of conical mirror 268C.

In some variants borehole imaging module 1360 may be configured for removable attachment to a drill bit or otherwise supported by a drill rig (right after the borehole is formed and while the drill rig 1226 is still aligned with the borehole, e.g.). FIG. 14 depicts a housing 1410 of the unit to include a first section 1405 adjacent a transparent side wall 1430 so that together (optionally with one or more other sections, e.g.) they form a closed chamber 1483. In some variants an upper one of the sections (along a generally vertical axis 1311B, e.g.) may be formed with a recess on an upper end thereof in which one or more magnetic flux guiding elements 1497 (ferromagnets, e.g.) are affixed. In some variants the recess may be dimensioned to engage with a lower extremity of a borehole drill bit so that borehole imaging system 1400 may be selectively attached to the borehole drill bit via the flux guiding element(s) and then extended into borehole 1302B. Alternatively or additionally the housing 1410 may be configured to rotate relative to the borehole 1302B.

In some variants at least one of the one or more mirrors 268C configured to redirect a reflected portion 1319 of the light 1314 of (at least) an infrared frequency incident from the side wall 1301 of the borehole does not present a nominally convex reflecting surface thereof to redirect the light. This can occur, for example, in a context in which mirror 268C is implemented as a nominally planar reflecting surface and in which in which borehole-wall-curvature-induced image distortions would otherwise create an unacceptably large computational challenge (stitching image components together, e.g.). Alternatively or additionally, a mirror 268C of borehole imaging system 1400 may be configured to redirect a reflected portion 1319 of the light of (at least) the infrared frequency incident from the side wall of the borehole may be mounted for rotation 1412 (on rotatable support 1478, e.g.) relative to the housing 1410.

FIG. 15 illustrates the borehole imaging system 1400 of FIG. 14 in which mirror 268C has been rotated (about axis 1311B, e.g.) so that a reflected portion 1319B of the light incident from the side wall 1301B comes from a circumferentially opposite portion of the borehole 1302B. This can occur, for example, in a context in which the rotational position of one or more mirrors 268C relative to the side wall 1301B of the borehole 1302B is detected (by a magnetometer 264 within housing 1410, e.g.) and correlated with the portion of image data 1245 with which that rotational position relates. In some variants, for example, a support 1478 for at least one of the mirrors 268C may be mounted for rotation relative to housing 1410. In others, one or more mirrors 268C of the borehole imaging system 1400 may be affixed to the housing and rotated relative to the side wall of the borehole by rotating an entirety of the housing 1410.

In light of teachings herein, numerous existing techniques may be applied for configuring special-purpose circuitry or other structures effective for analysis, blast design implementation, or other tasks as described herein without undue experimentation. See, e.g., U.S. Pat. No. 9,618,310 ("Method of blasting multiple layers or levels of rock"); U.S. Pat. No. 8,649,980 ("Active noise injection computations for improved predictability in oil and gas reservoir characterization and microseismic event analysis"); U.S. Pat. No. 8,538,698 ("Blasting method"); U.S. Pat. No. 8,416,418 ("Method and apparatus for gold detection"); U.S. Pat. No. 7,911,760 ("Electronic blasting system"); U.S. Pub. No. 20170146452 ("Quantitative assessment of soil contaminants, particularly hydrocarbons, using reflectance spectroscopy"); U.S. Pub. No. 20170124711 ("Universal correspondence network"); U.S. Pub. No. 20170038188 ("Composition and method for blast hole loading"); U.S. Pub. No. 20170028443 ("Sorting materials using pattern recognition, such as upgrading nickel laterite ores through electromagnetic sensor-based methods"); U.S. Pub. No. 20160299091 ("Extracting mined ore, minerals or other materials using sensor-based sorting"); U.S. Pub. No. 20160209195 ("Wearable blasting system apparatus"); U.S. Pub. No. 20160042272 ("Data-driven analytics, predictive modeling & optimization of hydraulic fracturing in marcellus shale"); U.S. Pub. No. 20150071033 ("Correlation techniques for passive electroseismic and seismoelectric surveying"); U.S. Pub. No. 20150052092 ("Methods and systems of brain-like computing virtualization"); U.S. Pub. No. 20150006444 ("Method and system for obtaining improved structure of a target neural network"); U.S. Pub. No. 20140136170 ("Adaptive weighting of geophysical data types in joint inversion"); U.S. Pub. No. 20140343754 ("Remote control system for drill"); U.S. Pub. No. 20140119159 ("Methods for in-situ borehole seismic surveys using downhole sources"); U.S. Pub. No. 20140083765 ("Automatic control system and method for a drilling tool changer apparatus"); U.S. Pub. No. 20120139325 ("Mystem and method for terrain analysis"); U.S. Pub. No. 20060262480 ("Security enhanced blasting apparatus, and method of blasting"); and U.S. Pub. No. 20050171700 ("Device and system for calculating 3D seismic classification features and process for geoprospecting material seams").

Figure 16:
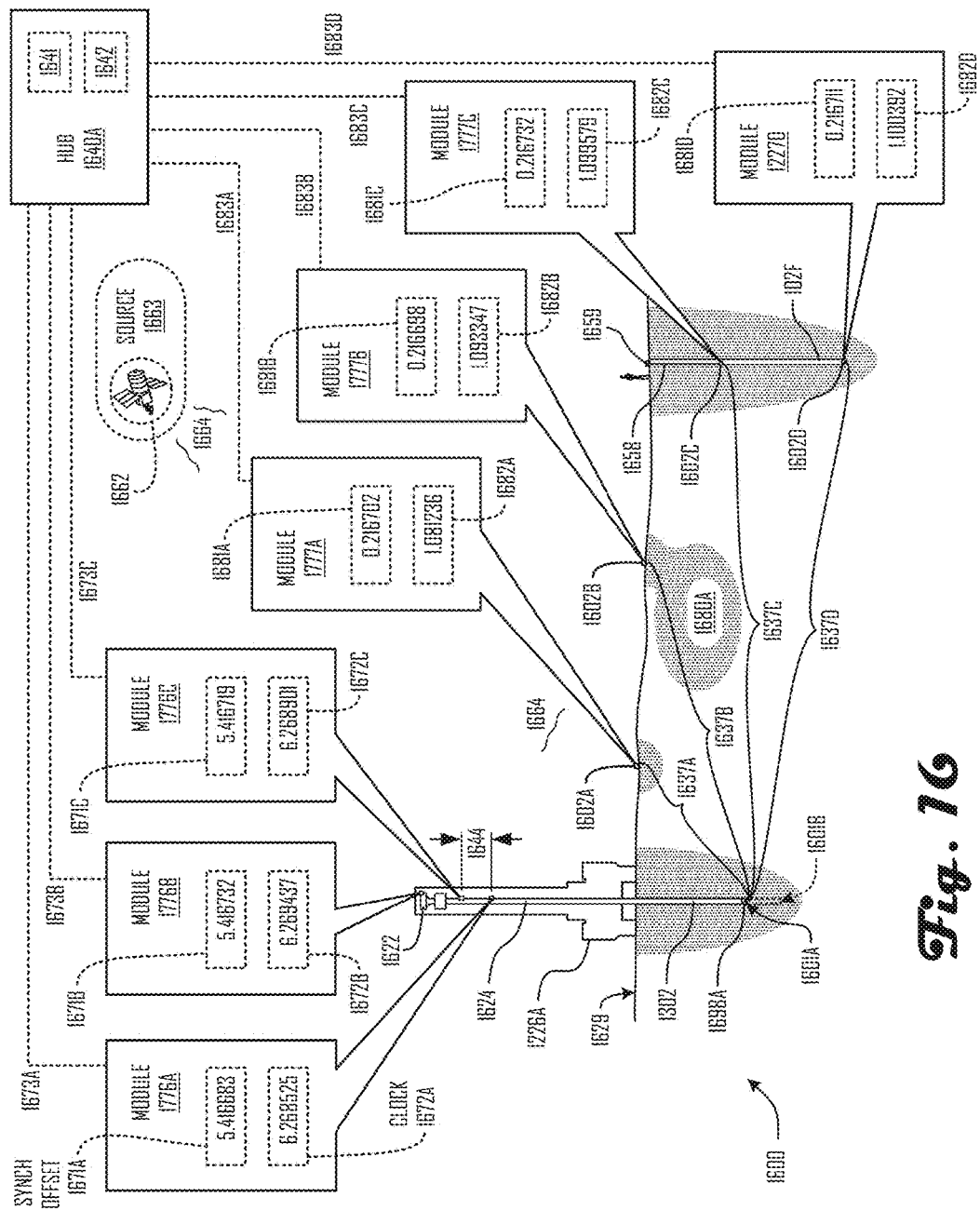
FIG. 16 realistically illustrates one or more systems in which a drill rig is drilling a borehole, advancing a drill string and bit through a material body (a bench or part thereof, e.g.) with various monitoring equipment active.

FIG. 16 realistically illustrates one or more systems 1600 in which a drill rig 1226A is drilling a borehole 1302, advancing a drill string 1624 and bit through a material body 1680A (a bench 100 or part thereof, e.g.) of a (prospective or established) mine from one position 1601A toward another position 1601B. During such drilling, one or more geophone modules 1777A-D (on a bench surface 1629 or in a nearby blast hole 102F, e.g.) may be positioned in contact with material body 1680A to sense a respective geological signal (see FIG. 17) that indirectly indicates the movement of the drill bit across a corresponding seismic span 1637A-D (beginning at a seismic span "start" position 1601 and ending at a corresponding seismic span "end" position 1602A-D, e.g.). Also to the degree that there are non-uniform geological properties that affect the direction and speed by which various frequencies of seismic energy travel to the end position 1602 and depending upon a drilling mode and other factors (bit type and condition, e.g.) that affect the bit movement, a lot of useful information may be present in the seismic signal at each end position 1602. Unfortunately mere autocorrelation (between starting and ending waveforms, e.g.) and other conventional synchronization techniques are inadequate for determining with precision when seismic energy began and ended its traverse of any seismic span 1637 like those depicted because of the high seismic energy travel speeds, especially in non-fragmented or especially hard portions of a material body. One or more such modules 1777 may (optionally) have a corresponding local clock 1682A-D therein (with a digital value of a seismic energy arrival therein expressed in seconds as shown, e.g.) as further described below. In some contexts one or more such modules may also record a corresponding local synchronization offset 1681A-D (digitally indicating when a most recent synchronization event was detected there, e.g.).

Also during such drilling, one or more vibration sensors (in measurement modules 1776A-C, e.g.) may be rigidly (directly or otherwise) affixed to a movable part (a drill head 1622 or drill string 1624, e.g.) of the same drill rig 1226 so that a movement of the drill bit can provide not only measurement-while-drilling data 1240 but also (in a case where each vibration sensor is an estimated distance from a leading edge of the drill bit, e.g.) a helpful operand in performing seismic span synchronization. In some variants one or more such modules 1776 may (optionally) have a corresponding local clock 1671A-C on board (with a digital value of a seismic energy arrival therein expressed in seconds as shown, e.g.) as further described below. (Because such signals travel very rapidly through the drill rig 1226 to a sensor mounted on the drill rig, they are herein referred to as "onboard indications" of a movement of the drill bit.) In some contexts one or more such modules may also record a corresponding local synchronization offset 1671A-D (digitally indicating when a most recent synchronization event was generated or otherwise detected there, e.g.). Moreover in some variants two or more measurement modules 1776A, 1776C (each including an accelerometer and strain gauge, e.g.) may be mounted at respective positions along drill string 1624 (spanning a longitudinal offset 1644 therebetween on the order of 0.2 or 2 meters, e.g.) so as to facilitate the monitoring of harmonic dampening (of the entire drill string 1624, e.g.) with greater precision.

In some simple variants any one of the measurement modules 1776 may be used with any one of the geophone modules 1777 as shown to effectuate sufficient synchronization to facilitate a "seismic" spatial model as described herein. With or without an onboard clock 1672, an onboard synchronization event indication (like synch offset 1671, e.g.) signifies when a synchronization phenomenon is generated or otherwise detected at a measurement module 1776. With or without a geophone clock 1682, a geophone synchronization event indication (like synch offset 1681, e.g.) signifies when a synchronization phenomenon is detected at a geophone module 1777. Such synchronization events may be communicated effectively across one or more wireless signal paths (one or more of paths 1673A-C, 1683A-D as shown, e.g.) or as electromagnetic energy 1664 as shown (from a measurement module 1776 or autonomous synchronization energy source 1663, e.g.). In some variants, for example, an above-ground hub 1640A (implemented as a local hub server 800 or on a surface component 1659 of an in-hole geophone module 1777C-D, e.g.) may receive electromagnetic energy 1664 from a global positioning system (GPS) satellite 1662 or from a measurement module 1776. Alternatively or additionally, such a seismic module 1777 may include a cable 1658 that links the components thereof (a geophone with a transducer thereof, e.g.). The usefulness of such configurations will be evident in converting span coordinates 1641 (describing one or both end positions of a given seismic span 1637) to give context for highly accurate delay indices 1642 as further exemplified below.

As used herein a "delay index" is an empirically determined through-rock seismic propagation delay estimate or other velocity-indicative or frequency-indicative determination associated with a seismic span position (defined by coordinates 1641 at one or both ends of a seismic span 1637, e.g.), whether or not the seismic signal path "spanned" is linear or frequency-dependent. As used herein (an instance of) a delay index is "related" to a spatial model if it is part of the model or used in a (manual or other) derivation/refinement of the model. In some variants, for example, the model may include respective positions 410 assigned to respective material bodies (bench parts, e.g.). Alternatively or additionally, a spatial model may associate non-uniform material properties ("high" or "low" values or respective scalar quantifications, e.g.) at respective locations within a rock body. As used herein, a spatial model is "seismic" if it reflects rock properties (measurements or inferred fault locations, e.g.) gleaned by observing seismic energy emerging from a rock body via geophones or the like. Likewise a spatial model is "optical" if it reflects rock properties (material compositions or structures, e.g.) gleaned by observing photographic images or the like. Likewise a spatial model may be "seismic-while-drilling-based" or "measurement-while-drilling-based" as used herein (or both or neither) in some variants.

In a first scenario, for example, a local clock 1672C of measurement module 1776C is monitored so as to determine that at a local time of 5.416719 seconds a first synchronizing phenomenon was observed (an inbound or outbound pulse of electromagnetic energy 1664, e.g.). Oscillator drift in measurement module 1776C was relatively small because within a short time (i.e. less than one second before or after) thereof an indication of bit movement was detected at a local time of 6.268901 seconds. (Seismic energy traveling through steel takes approximately 57 microseconds to travel a foot.). Meanwhile a local clock 1682A of geophone module 1777A is likewise monitored so as to determine that at a local time of 0.216702 seconds the same first synchronizing phenomenon was observed. Oscillator drift in geophone module 1777A was relatively small because within a short time thereof a seismic signal indicative of the same bit movement was detected at a local time of 1.081236 seconds. Neglecting other factors (within-module processing delays and electromagnetic energy travel times, e.g.) for the sake of simplicity, these values indicate a span delay of 12.352 milliseconds (computed as 1.081236–0.216702–(6.268901–5.416719) equals 0.012352 seconds, e.g.). This might be a useful value to a geologist trying to create or improve a model of material body 1680A in light of known start and end positions 1601A, 1602B of seismic span 1637B. (Seismic energy traveling through fragmented rock can take hundreds of microseconds to travel a foot, but travel may be much faster if a material body is continuous.)

In a second scenario, moreover, a local clock 1672C of measurement module 1776C is monitored so as to determine that at a local time of 5.416719 seconds a first synchronizing phenomenon was observed and that an indication of bit movement was detected at a local time of 6.268901 seconds. Meanwhile a local clock 1682D of geophone module 1777D is likewise monitored so as to determine that at a local time of 0.216711 seconds the same first synchronizing phenomenon was observed. Oscillator drift in geophone module 1777D was relatively small, notwithstanding a lower temperature, because within a short time thereof a seismic signal indicative of the same bit movement was detected at a local time of 1.100392 seconds. (Seismic energy traveling through rock generally takes hundreds of microseconds to travel a foot.). Neglecting other factors (within-module processing delays and electromagnetic energy travel times, e.g.) for the sake of simplicity, these values indicate a span delay of 31.499 milliseconds (computed as 1.100392–0.216711–(6.268901–5.416719) equals 0.031499 seconds, e.g.). This might likewise be a useful value to a geologist trying to create or improve a model in light of known start and end positions 1601A, 1602D of seismic span 1637D.

FIG. 17 schematically illustrates a surveying system 1700 that may exemplify those depicted in FIG. 16. Using a method similar to those described below (see FIG. 21), an onboard indication of a movement of a drill bit (as a measurement signal 1756, e.g.) is obtained via one or more vibration sensors (see FIGS. 18-19, e.g.) aboard a movable part of a drill rig (a drill head 1622 or drill string 1624, e.g.) and as a component of a measurement module 1776, wherein an electromagnetic transducer 1730A is operably coupled (i.e. for signal transmission therebetween) to the one or more vibration sensors. Likewise a geological signal 1757 indicating the same movement of the drill bit is obtained via one or more geophones 1227 mechanically coupled to the material body 1680A (by a firm engagement) and as a component of a respective (instance of) geophone module 1777, wherein another electromagnetic transducer 1730B is operably coupled (i.e. for signal transmission therebetween) to the one or more geophones 1227. A respective synchronization time 1739A-B is established for each via one or more wireless signal paths (one or more of links 1716A-D as shown, e.g.) each spanning (at least) a free space medium 1711 (air, e.g.) between the first electromagnetic transducer 1730A operably coupled to the one or more vibration sensors 1895 aboard the movable part of the drill rig 1226 and the second electromagnetic transducer 1730B operably coupled (via a cable or wireless link 1716, e.g.) to the one or more geophones 1227 mechanically coupled to the material body 1680 of the mine 300. For example an LTE or other wireless local area network (WLAN) tower 1762 or similar local source 1663 may allow synchronization of one or more measurement signal(s) 1756 with geophone signal(s) 1757 (at a hub 1640 within source 1663 or attached to the geophone module(s) 1777 via cables 1658, e.g.).

As used herein, events at two or more locations are "synchronized" by substantially reducing (i.e. by more than 50%) a timing-related measurement error/uncertainty that might otherwise result from a substantial drift (i.e. corresponding to a delay mismeasurement larger than 1 millisecond) of a frequency of oscillation at one or more of the locations (of respective local clock signals, e.g.). For present purposes a synchronization is deemed "adequate" for use with one or more (nominal) clock frequency drifts up to 0.001% if synchronized within one minute before or after a seismic energy arrival or departure under observation. Likewise a synchronization is deemed "adequate" for use with one or more clock frequency drifts up to 0.01% if synchronized within six seconds before or after a seismic energy arrival or departure under observation.

FIG. 18 schematically illustrates another surveying system 1800 that may exemplify those depicted in FIG. 16. An onboard indication of a movement of a drill bit 1698B is obtained via two or more vibration sensors 1895 aboard a rotating drill string 1624 and as a component of a battery-powered measurement module 1776A, wherein an electromagnetic transducer is operably coupled to the one or more vibration sensors 1895 (including both an accelerometer 1891 and a strain gauge 1892, e.g.) and configured to transmit the measurement signal immediately to a hub 1640B. Likewise a geological signal 1757 indicating the same movement of the drill bit is obtained via one or more geophones 1227 mechanically coupled to the material body 1680B (by a firm engagement) and as a component of a respective geophone module 1777A, operably coupled via cable 1858 to the hub 1640B. In this variant, neither the measurement module(s) 1776A nor the geophone module(s) 1777A need to have a clock 1772, which resides in the hub 1640B instead. Nevertheless this configuration facilitates a characterization of one or more spatial model components describing composite densities 1881A, compositions 1882A, rock impedances 1883A, hardness 1884A, Young's modulus 1885A, shear strain 1886A, or other such properties 1887A (at respective physical locations) by providing a very precise determination of one or more delay indices 1642 relating to each corresponding seismic span 1637.

FIG. 19 schematically illustrates another surveying system 1900 that may exemplify those depicted in FIG. 16. An onboard indication of a vibration of a drill bit 1698C is obtained via one or more sensors 1995 aboard a drill string 1624 and as a component of a battery-powered measurement module 1776B, wherein an electromagnetic transducer is operably coupled to the one or more vibration sensors 1995 and configured to transmit the measurement signal to a hub 1640C via wireless link 1716G after receiving a synchronization pulse at local clock 1772A from hub clock 1772B via wireless link 1716F. Likewise an electromagnetic transducer is operably coupled to the one or more geophones of geophone module 1777B adjacent material body 1680C via wireless link 1916B after receiving a synchronization pulse at local clock 1772C from hub clock 1772B via wireless link 1916A. This configuration likewise facilitates a characterization of one or more spatial model components describing (at respective physical locations thereof) composite densities 1881B, compositions 1882B, rock impedances 1883B, hardness 1884B, Young's modulus 1885B, shear strain 1886B, or other such properties 1887B by providing a very precise determination of one or more delay indices 1642 relating to each corresponding seismic span 1637.

Figure 20:
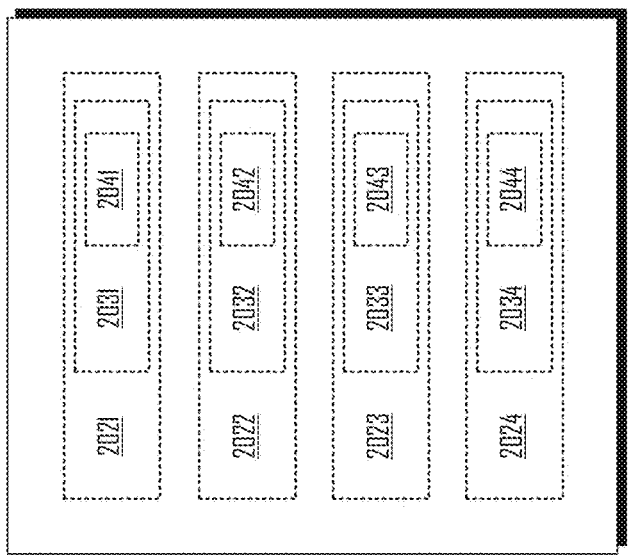
FIG. 20 illustrates a special-purpose event-sequencing structure of one or embodiments.

FIG. 20 illustrates special-purpose transistor-based circuitry 2000—optionally implemented as an Application-Specific Integrated Circuit (ASIC), e.g.—in which some or all of the functional modules described herein may be implemented. Transistor-based circuitry 2000 is an event-sequencing structure generally as described in U.S. Pat. Pub. No. 2015/0094046 but configured as described herein. Transistor-based circuitry 2000 may include one or more instances of modules 2021-2024 configured for local processing, for example, each including an electrical node set 2031-2034 upon which informational data is represented digitally as a corresponding voltage configuration 2041-2044. In some variants, moreover, an instance of modules 2021-2024 may be configured for invoking such processing modules remotely in a distributed implementation. Transistor-based circuitry 2000 may likewise include one or more instances of modules configured for programmatic response as described below, for example, each including an electrical node set upon which informational data is represented digitally as a corresponding voltage configuration. In some variants, an instance of modules may be configured for invoking such programmatic response modules remotely in a distributed implementation.

Figure 21:
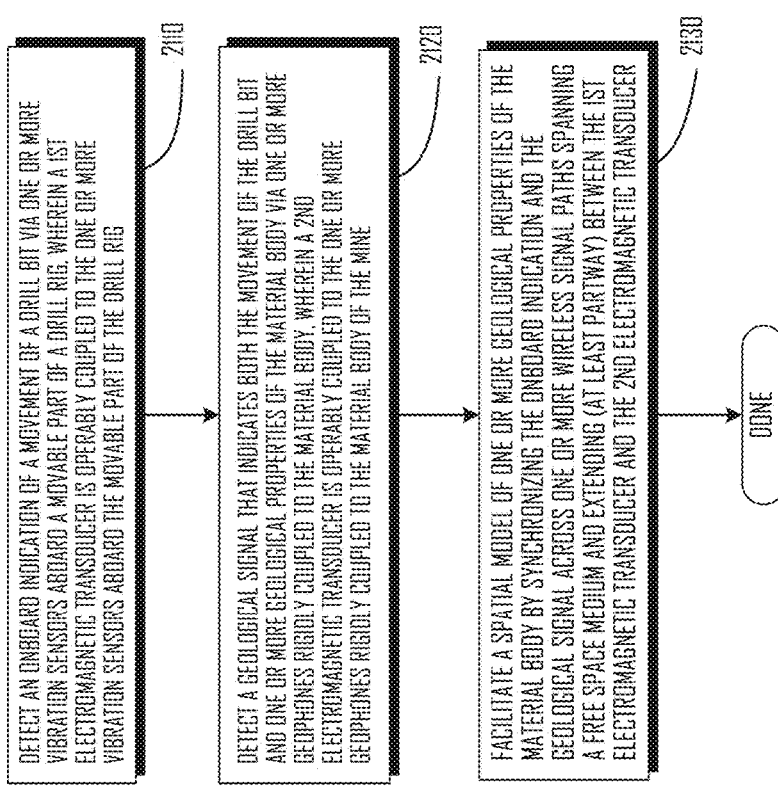
FIG. 21 illustrates a flow that depicts a computer-implemented method of one or embodiments.

FIG. 21 illustrates an operational flow 2100 in which one or more technologies may be implemented (within or in conjunction with one or more servers 800, e.g.). Operation 2110 describes detecting an onboard indication of a movement of a drill bit via one or more vibration sensors aboard a movable part of a drill rig, wherein a first electromagnetic transducer is operably coupled to the one or more vibration sensors aboard the movable part of the drill rig (one or more invocation or processing modules 2021 detecting a measurement signal 1756 from an accelerometer or strain gauge of a measurement module 1776 mounted onto a drill head or drill rig a signal resulting from a vibration of a drill bit 1698 and synchronizing that signal within a minute later or earlier via an electromagnetic transducer of the measurement module 1776, e.g.). This can occur, for example, in a context in which a synch offset 1671 or other event time is digitally manifested as voltage configuration 2041 inside the measurement module 1776 or a corresponding hub 1640 as described above (or both).

Operation 2120 describes detecting a geological signal that indicates both the movement of the drill bit and one or more geological properties of the material body via one or more geophones rigidly coupled to the material body, wherein a second electromagnetic transducer is operably coupled to the one or more geophones rigidly coupled to the material body of the mine (one or more invocation or processing modules 2022 detecting a geological signal 1757 that indicates both the same movement of the same drill bit 1698 and one or more geological properties 1887 of the material body 1680 via one or more geophones 1227 rigidly coupled to the material body 1680, e.g.). This can occur, for example, in a context in which an electromagnetic transducer (in a frequency-modulated transmitter or receiver, e.g.) is operably coupled (via a cable 1658, 1858 or local wireless linkage 1916, e.g.) to the one or more geophones 1227 rigidly coupled to the material body of the mine, in which several such geophones 1227 are connected in an array across a bench surface 1629 or down a blast hole 102F, and in which a synch offset 1681 or other event time is digitally manifested as voltage configuration 2042 inside the geophone module(s) 1776 or a corresponding hub 1640 as described above (or both).

Operation 2130 describes facilitating a spatial model of one or more geological properties of the material body by synchronizing the onboard indication and the geological signal across one or more wireless signal paths spanning a free space medium and extending between the first electromagnetic transducer and the second electromagnetic transducer (one or more invocation or processing modules 2023, 2024 jointly enhancing the spatial model of one or more geological properties 1887 of a material body 1680 by synchronizing the measurement signal 1756 and the geological signal 1757 across one or more wireless signal paths 1716A spanning free space medium 1711 and extending between the first electromagnetic transducer 1730A and the second electromagnetic transducer 1730B, e.g.). This can occur, for example, in a context in which both such modules 2023, 2024 reside together (within a single common geophone module 1777 or hub 1640, e.g.); in which module 2024 performs the synchronization (by determining a temporal relation between when each seismic signal began and ended its journey from the drill bit to a geophone module so as to minimize error due to frequency drift by taking advantage of the speed of electromagnetic energy 1664 along the one or more wireless signal paths 1716, e.g.); in which one or more highly accurate delay indices 1642 thereby made possible are digitally manifested as voltage configuration 2044; in which module 2023 facilitates the spatial model of the one or more geological properties by using the one or more highly accurate delay indices 1642; and in which the spatial model includes estimates of rock impedance 1883 or other geological properties 1887 that are much more accurate than would otherwise have been possible with frequency drifts (having a nominal frequency drift specification of 0.01% or larger, e.g.) of clocks 1672, 1772 or other oscillators therein. Alternatively or additionally, in some contexts a categorical feature of a model (a predicted concentration 175 being locally "marginal" or a promising fault being apparently "present" in a defined bench part 170B, e.g.) may be confirmed (by reducing an uncertainty thereof, e.g.) very effectively by seismic survey protocols as described herein.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A SURVEYING SYSTEM for use with a drill rig 1226 that includes a drill bit 1698 adjacent a material body 1680 (a bench 100 or part thereof, e.g.) of a mine 300, the surveying system comprising:

transistor-based circuitry (a processing module 2021 operably coupled to one or more measurement modules 1776, e.g.) configured to detect (as a measurement signal 1756, e.g.) an onboard indication of a movement of the drill bit 1698 via one or more vibration sensors 1895, 1995 aboard a movable part (a drill head 1622 or drill string 1624, e.g.) of the drill rig 1226, wherein a first electromagnetic transducer 1730A is operably coupled to the one or more vibration sensors 1895, 1995 aboard the movable part of the drill rig 1226;

transistor-based circuitry (a processing module 2022 operably coupled to one or more geophone modules 1777, e.g.) configured to detect a geological signal 1757 that indicates both the movement of the drill bit 1698 (a rotation or percussion, e.g.) and one or more geological properties 1887 of the material body 1680 via one or more geophones 1227 mechanically (directly or otherwise) coupled to the material body 1680, wherein a second electromagnetic transducer 1730B is operably coupled to the one or more geophones 1227 (implemented as a special-purpose accelerometer, e.g.) mechanically coupled to the material body 1680 of the mine 300; and transistor-based circuitry (a processing module 2023 implementing or operably coupled to one or more hubs 1640, e.g.) configured to facilitate a spatial model (a high resolution geometric model 520 at least partly based on one or more seismic delay indices 1642, e.g.) of the one or more geological properties 1887 of the material body 1680 by synchronizing the onboard indication and the geological signal across one or more wireless signal paths 1673, 1683 (forming one or more synchronization signal or other event-sequencing links 1716, e.g.) spanning (at least) one or more free space media 1711 (air, e.g.) between the first electromagnetic transducer 1730A operably coupled to the one or more vibration sensors 1895 aboard the movable part of the drill rig 1226 and the second electromagnetic transducer 1730B operably coupled (via a cable 1858 or wireless link 1716, e.g.) to the one or more geophones 1227 mechanically coupled to the material body 1680 of the mine 300.

2. The system of SURVEYING SYSTEM CLAUSE 1, wherein a wireless internet-of-things platform operably couples the one or more geophones with a hub 1640 as described herein.

3. The system of any of the SURVEYING SYSTEM CLAUSES above, wherein a hub 1640 implemented as a local hub server 800A is configured to perform the synchronizing the onboard indication and the geological signal across the one or more wireless signal paths 1673, 1683 (forming one or more synchronization signal or other event-sequencing links 1716, e.g.) between the first electromagnetic transducer 1730A operably coupled to the one or more vibration sensors 1895 aboard the movable part of the drill rig 1226 and the second electromagnetic transducer 1730B operably coupled to the one or more geophones 1227 mechanically coupled to the material body 1680.

4. The system of any of the SURVEYING SYSTEM CLAUSES above, comprising a hub 1640 configured to distill a result of combining the seismic data from the geophone module with the measurement data from the measurement module by synchronizing timestamp data (synch offsets 1671, 1681 or other digital clock values, e.g.) from the first measurement module and from the first geophone module.

5. The system of any of the SURVEYING SYSTEM CLAUSES above, comprising (an instance of) a hub 1640 configured to include the transistor-based circuitry configured to characterize the one or more geological properties 1887 of the material body and wirelessly coupled to the transistor-based circuitry configured to detect the onboard indication of the movement of the drill bit via one or more vibration sensors aboard the movable part of the drill rig 1226.

6. The system of any of the SURVEYING SYSTEM CLAUSES above, comprising the drill rig 1226, wherein the drill rig includes the drill bit.

7. The system of any of the SURVEYING SYSTEM CLAUSES above, wherein the system is configured to perform a method of one of the SURVEYING METHOD CLAUSES below.

8. (Independent) A SURVEYING METHOD for use with a drill rig 1226 that includes a drill bit 1698 adjacent a material body 1680 (a bench 100 or part thereof, e.g.) of a mine 300, the surveying method comprising:

invoking transistor-based circuitry (by a processing unit 702 performing operation 2110 by invoking a processing module 2021 as described above, e.g.) configured to detect (as a measurement signal 1756, e.g.) an onboard indication of a movement of the drill bit 1698 via one or more vibration sensors 1895, 1995 aboard a movable part (a drill head 1622 or drill string 1624, e.g.) of the drill rig 1226, wherein a first electromagnetic transducer 1730A is operably coupled to the one or more vibration sensors 1895, 1995 aboard the movable part of the drill rig 1226;

invoking transistor-based circuitry (by the processing unit 702 performing operation 2120 by invoking a processing module 2022 as described above, e.g.) configured to detect a geological signal 1757 that indicates both the movement of the drill bit 1698 (a rotation or percussion, e.g.) and one or more geological properties 1887 of the material body 1680 via one or more geophones 1227 mechanically (directly or otherwise) coupled to the material body 1680, wherein a second electromagnetic transducer 1730B is operably coupled to the one or more geophones 1227 (implemented as a special-purpose accelerometer, e.g.) mechanically coupled to the material body 1680 of the mine 300; and invoking transistor-based circuitry (by processing unit 702 performing operation 2130 by invoking a processing module 2023 as described above, e.g.) configured to facilitate a spatial model (a high resolution geometric model 520 at least partly based on one or more seismic delay indices 1642, e.g.) of the one or more geological properties 1887 of the material body 1680 by synchronizing the onboard indication and the geological signal across one or more wireless signal paths 1673, 1683 (forming one or more synchronization signal or other event-sequencing links 1716, e.g.) spanning (at least) one or more free space media 1711 (air, e.g.) between the first electromagnetic transducer 1730A operably coupled to the one or more vibration sensors 1895 aboard the movable part of the drill rig 1226 and the second electromagnetic transducer 1730B operably coupled (via a cable 1858 or wireless link 1716, e.g.) to the one or more geophones 1227 mechanically coupled to the material body 1680 of the mine 300.

9. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

the first electromagnetic transducer 1730A transmitting an indication of a synch time 1739A via a wireless link 1716 (along any of paths 1673A-C as an analog or digital value, e.g.).

10. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

the second electromagnetic transducer 1730B receiving an analog indication of a synch time immediately manifested at the first electromagnetic transducer 1730A (as a measurement signal 1756 or as a frequency modulation, e.g.) and via a wireless link 1716.

11. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

a hub 1640 synchronizing the onboard indication and the geological signal across the one or more wireless signal paths 1673, 1683 (forming one or more synchronization signal or other event-sequencing links 1716, e.g.) between the first electromagnetic transducer 1730A operably coupled to the one or more vibration sensors 1895 aboard the movable part of the drill rig 1226 and the second electromagnetic transducer 1730B operably coupled to the one or more geophones 1227 mechanically coupled to the material body 1680, the hub 1640 being part of a geophone module 1777 that includes at least one of the one or more geophones 1227.

12. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

synchronizing the onboard indication and the geological signal across a wireless signal path 1716A from the electromagnetic transducer 1730A operably coupled to the one or more vibration sensors 1895 aboard the movable part of the drill rig 1226 to the second electromagnetic transducer 1730B operably coupled (via a cable 1858 or wireless link 1716, e.g.) to the one or more geophones 1227 mechanically coupled to the material body 1680 of the mine 300.

13. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

synchronizing the onboard indication and the geological signal across a wireless signal path 1716A from the electromagnetic transducer 1730A operably coupled to the one or more vibration sensors 1895 aboard the movable part of the drill rig 1226 to the second electromagnetic transducer 1730B operably coupled (via a cable 1858 or wireless link 1716, e.g.) to the one or more geophones 1227 mechanically coupled to the material body 1680 of the mine 300, and wherein the measurement module 1776 does not store any synch times 1739A but instead establishes the synch time by transmitting electromagnetic energy 1664 indicative of a synchronizing event via the first electromagnetic transducer 1730A to the second electromagnetic transducer 1730B.

14. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

synchronizing the onboard indication and the geological signal across a wireless signal path 1716A from the electromagnetic transducer 1730A operably coupled to the one or more vibration sensors 1895 aboard the movable part of the drill rig 1226 to the second electromagnetic transducer 1730B operably coupled (via a cable 1858 or wireless link 1716, e.g.) to the one or more geophones 1227 mechanically coupled to the material body 1680 of the mine 300, wherein the measurement module 1776 does not store any synch times 1739A but instead establishes the synch time by transmitting a frequency-modulated electromagnetic synchronizing signal (an instance of wireless energy 1664 traveling through air, e.g.) indicative of a synchronizing event via the first electromagnetic transducer 1730A to the second electromagnetic transducer 1730B, and wherein a frequency modulation of the frequency-modulated electromagnetic synchronizing signal signifies the synchronizing event.

15. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

synchronizing the onboard indication and the geological signal across two or more wireless signal paths 1716B, 1716C from a global positioning system (GPS) satellite 1662 to the electromagnetic transducer 1730A operably coupled to the one or more vibration sensors 1895 aboard the movable part of the drill rig 1226 and to the second electromagnetic transducer 1730B operably coupled (via a cable 1858 or wireless link 1716, e.g.) to the one or more geophones 1227 mechanically coupled to the material body 1680 of the mine 300 both, and wherein electromagnetic energy 1664 passing from orbit to the first and second electromagnetic transducers define two of the two or more wireless signal paths.

16. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

synchronizing the onboard indication and the geological signal across two or more wireless signal paths 1716B, 1716C from a global positioning system (GPS) satellite 1662 to the electromagnetic transducer 1730A operably coupled to the one or more vibration sensors 1895 aboard the movable part of the drill rig 1226 and to the second electromagnetic transducer 1730B operably coupled (via a cable 1858 or wireless link 1716, e.g.) to the one or more geophones 1227 mechanically coupled to the material body 1680 of the mine 300 both, wherein electromagnetic energy 1664 passing from orbit to the first and second electromagnetic transducers define two of the two or more wireless signal paths, wherein the onboard indication is synchronized to a first pulse from the GPS satellite 1662, and wherein the geological signal is synchronized to a second pulse from the GPS satellite 1662 (one second later, e.g.) and not to the first pulse.

17. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

synchronizing the onboard indication and the geological signal across two or more wireless signal paths 1716B, 1716C from a wireless local area network (WLAN) tower 1762 to the electromagnetic transducer 1730A operably coupled to the one or more vibration sensors 1895 aboard the movable part of the drill rig 1226 and to the second electromagnetic transducer 1730B operably coupled (via a cable 1858 or wireless link 1716, e.g.) to the one or more geophones 1227 mechanically coupled to the material body 1680 of the mine 300 both.

18. The method of any of the above SURVEYING METHOD CLAUSES above, wherein the invoking transistor-based circuitry configured to detect the geological signal that indicates both the movement of the drill bit and the one or more geological properties 1887 of the material body 1680 via one or more geophones 1227 comprises:

receiving at a hub the geological signal signaling span coordinates 1641 signaling propagation start and stop locations (relating to a seismic span 1637, e.g.) associated with the geological signal, wherein the geological signal results from seismic energy having incurred a delay (indicated by a delay index 1642, e.g.) when propagated through a mine bench 100 between the propagation start and stop locations.

19. The method of any of the above SURVEYING METHOD CLAUSES above, wherein the invoking transistor-based circuitry configured to characterize the one or more geological properties 1887 of the material body 1680 comprises:

temporally synchronizing the geophone signal 1757 that indicates both the movement of the drill bit 1698 and the one or more geological properties 1887 of the material body 1680 via one or more geophones 1227 mechanically coupled to the material body 1680 with a measurement signal 1756 indicative of the movement of the drill bit 1698 via the one or more vibration sensors 1895, 1995 aboard the movable part of the drill rig 1226 by arithmetically combining using timestamp data from the first geophone module (synch offset 1681, e.g.) and timestamp data from the first measurement module (synch offset 1671, e.g.).

20. The method of any of the above SURVEYING METHOD CLAUSES above, wherein the invoking transistor-based circuitry configured to characterize the one or more geological properties 1887 of the material body 1680 comprises:

configuring a hub 1540 local to the drill rig 1226 and having a central processing unit 702, memory 704, and a hub communication interface (network interface 706, e.g.) communicatively coupled to the first geophone module 1227 and to the first measurement module 1571.

21. The method of any of the above SURVEYING METHOD CLAUSES above, wherein the invoking transistor-based circuitry configured to characterize the one or more geological properties 1887 of the material body 1680 comprises:

invoking transistor-based circuitry configured to obtain span coordinates 1641 and a delay index 1642 associated with the span coordinates all as components of the spatial model (high resolution geometric model 520, e.g.); and invoking transistor-based circuitry configured to process the spatial model through a neural network 530.

22. The method of any of the above SURVEYING METHOD CLAUSES above, wherein the invoking transistor-based circuitry configured to characterize the one or more geological properties 1887 of the material body 1680 comprises:

synchronizing transistor-based circuitry configured to detect the onboard indication of the (prospective or actual) movement of the drill bit 1698 via the one or more vibration sensors 1895, 1995 aboard the movable part (a drill head 1622 or drill string 1624, e.g.) of the drill rig 1226 with transistor-based circuitry configured to detect the (prospective or actual) geological signal 1757 that indicates both the movement of the drill bit 1698 and the one or more geological properties 1887 of the material body 1680 via the one or more geophones 1227 mechanically coupled to the material body 1680 across the one or more wireless signal paths (links 1716, e.g.) between the first electromagnetic transducer 1730A operably coupled to the one or more vibration sensors 1895 aboard the movable part of the drill rig 1226 and the second electromagnetic transducer 1730B operably coupled (via a cable 1858 or wireless link 1716, e.g.) to the one or more geophones 1227 mechanically coupled to the material body 1680 of the mine 300.

23. (Independent) A SPECTRAL IMAGING SYSTEM 1300, 1400 comprising:

a housing 1310, 1410 configured to enter a first borehole 1302;

one or more light sources 1313 supported by the housing and configured to emit light 1314 (at least) of a spectrum including a first frequency onto a side wall 1301 of the first borehole 1302;

a controllable and retractable positioning mechanism (comprising a cable 258 or drill string 1624, e.g.) configured to move the housing 1310, 1410 (through a range of positions) within the first borehole;

one or more mirrors 268 configured to redirect a reflected portion 1319 of the light of a spectrum that includes the first frequency incident from the side wall of the first borehole;

an imaging module that includes one or more electro-optical sensors 1365 configured to convert the redirected reflected portion of the light of the first frequency into a first electronic signal (as a component of image data 1245, a sensed digital signal depicting the side wall of the first borehole, e.g.), wherein the imaging module further comprises transistor-based circuitry (as a component of special-purpose circuitry 722, e.g.) configured to obtain panoramic interior image data 1245 that depicts the first borehole at least partly based on the first electronic signal 1389 from the one or more electro-optical sensors 1365; and memory 704 configured to store at least a portion of the panoramic interior image data 1245.

24. The system of SPECTRAL IMAGING SYSTEM CLAUSE 23, wherein the imaging module 260 includes an orientation device (a magnetometer 264 having a directional readout selectively provided with the panoramic interior image data to which the directional readout pertains, e.g.).

25. The system of SPECTRAL IMAGING SYSTEM CLAUSE 23, wherein the imaging module 260 includes a magnetometer 264 implementing an orientation device.

26. The system any of the SPECTRAL IMAGING SYSTEM CLAUSES above, wherein the imaging module 260 includes one or more global positioning system (GPS) receivers.

27. The system of any of the SPECTRAL IMAGING SYSTEM CLAUSES above, wherein the memory 704 resides within the housing 1310, 1410.

28. The system of any of the SPECTRAL IMAGING SYSTEM CLAUSES above, wherein the first frequency comprises a first infrared frequency.

29. The system of any of the SPECTRAL IMAGING SYSTEM CLAUSES above, wherein the light includes light of a visible-spectrum frequency.

30. The system of any of the SPECTRAL IMAGING SYSTEM CLAUSES above, wherein the housing comprises:

a (nominally) opaque body (including one or more portions 1305, 1308, 1405, e.g.) and a lateral window (side wall 1330, 1430, e.g.) that is (nominally) transparent to light of the first frequency.

31. The system of any of the SPECTRAL IMAGING SYSTEM CLAUSES above, wherein the housing comprises:

a side wall 1330, 1430 that is (nominally) transparent to light of the first frequency around more than 90% of a lateral circumference of the housing 1310, 1410.

32. The system of any of the SPECTRAL IMAGING SYSTEM CLAUSES above, wherein the one or mirrors 268 include (at least) a portion of conical mirror 268A and wherein the one or more electro-optical sensors 1365 comprise an axially-directed camera (pointing generally upward or downward along axis 1311, e.g.) configured to capture an image of (a portion of) the side wall 1301 of the borehole by receiving light 1319 redirected from the portion of the conical mirror 268A.

33. The system of any of the SPECTRAL IMAGING SYSTEM CLAUSES above, wherein the one or mirrors 268 include a portion of a conical-parabolic mirror 268A and wherein the one or more electro-optical sensors 1365 comprise an axially-directed camera configured to capture an image of (a portion of) the side wall 1301 of the borehole by receiving light 1319 redirected from the portion of the conical-parabolic mirror 268A.

34. The system of any of the SPECTRAL IMAGING SYSTEM CLAUSES above, wherein the one or mirrors 268 include a portion of a rotating mirror 268C and wherein the one or more electro-optical sensors 1493 comprise an axially-directed camera (pointing generally upward or downward along axis 1311, e.g.) configured to capture an image of the side wall 1301B of the borehole by receiving light redirected from the portion of the rotating mirror 268C.

35. The system of any of the SPECTRAL IMAGING SYSTEM CLAUSES above, wherein more than 50% of a total optical energy (light 1314, e.g.) falling upon the side wall 1301 of the first borehole 1302 comprises diffuse illumination and wherein the light of the first frequency comprises a first component of the total optical energy.

36. The system of any of the SPECTRAL IMAGING SYSTEM CLAUSES above, wherein the housing 1310, 1410 is small enough to pass completely into a blast hole 102 in a mine bench 100 as described herein.

37. The system of any of the SPECTRAL IMAGING SYSTEM CLAUSES above, wherein the borehole imaging system 1300 is configured to image most or all of an interior of a blast hole 102 on a mine bench 100 as described herein.

38. The system of any of the SPECTRAL IMAGING SYSTEM CLAUSES above, wherein at least one of the one or more mirrors 268C configured to redirect a reflected portion 1319 of the light 1314 of the first frequency incident from the side wall 1301 of the first borehole does not present a (nominally) convex reflecting surface thereof to redirect the light (by virtue of being implemented as a nominally planar or saddle-shaped or other non-convex reflecting surface, e.g.).

39. The system of any of the SPECTRAL IMAGING SYSTEM CLAUSES above, wherein at least one of the one or more mirrors 268C configured to redirect a reflected portion 1319 of the light 1314 of the first frequency incident from the side wall 1301 of the first borehole presents a (nominally) planar reflecting surface configured to redirect the light without distortion.

40. The system of any of the SPECTRAL IMAGING SYSTEM CLAUSES above, wherein at least one of the one or more mirrors 268 configured to redirect a reflected portion 1319 of the light of the first frequency incident from the side wall of the first borehole is mounted for rotation relative to the side wall of the first borehole (by virtue of being mounted upon a housing or other support 1478 that can rotate relative to the side wall of the first borehole, e.g.).

41. The system of any of the SPECTRAL IMAGING SYSTEM CLAUSES above, wherein at least one of the one or more mirrors 268C configured to redirect a reflected portion 1319 of the light of the first frequency incident from the side wall of the first borehole is a mirror mounted for rotation (on rotatable support 1478, e.g.) relative to the housing 1310, 1410.

42. The system of any of the SPECTRAL IMAGING SYSTEM CLAUSES above, wherein the one or more light sources 1313 supported by the housing are configured to emit light 1314 of an ultraviolet frequency onto a side wall 1301 of the first borehole 1302 also and wherein ultraviolet and infrared light reflected from the side wall 1302 undergoes negligible refraction in being redirected to the one or more electro-optical sensors (by not passing through any lenses, e.g.).

43. The system of any of the SPECTRAL IMAGING SYSTEM CLAUSES above, wherein the one or more light sources 1313 supported by the housing are configured to emit light 1314 of a visible frequency onto a side wall 1301 of the first borehole 1302 also and wherein visible and infrared light reflected from the side wall 1302 undergoes negligible refraction in being redirected to the one or more electro-optical sensors (by not passing through any lenses, e.g.).

44. The system of any of the SPECTRAL IMAGING SYSTEM CLAUSES above, wherein the one or more light sources comprise a diffuse-light emitter 280.

45. The system of any of the SPECTRAL IMAGING SYSTEM CLAUSES above, wherein the one or more light sources comprise a diffuse-light emitter 280 implemented by passing incandescent light 1314 through a frosted filter 1315.

46. The system of any of the SPECTRAL IMAGING SYSTEM CLAUSES above, wherein the one or more light sources comprise a short wavelength infrared (SWIR) emitter 271, wherein at least some of the one or more electro-optic detectors 265, 1365 are configured to detect SWIR light, and wherein a concentration of a target mineral that selectively reflects SWIR light is thereby optically detectable within the interior image data 1245.

47. The system of any of the SPECTRAL IMAGING SYSTEM CLAUSES above, wherein the one or more light sources comprise a mid-wavelength infrared (MWIR) emitter 272, wherein at least some of the one or more electro-optic detectors 265, 1365 are configured to detect MWIR light, and wherein a concentration of a target mineral that selectively reflects MWIR light is thereby optically detectable within the interior image data 1245.

48. The system of any of the SPECTRAL IMAGING SYSTEM CLAUSES above, wherein the one or more light sources comprise a long wavelength infrared (LWIR) emitter 273, wherein at least some of the one or more electro-optic detectors 265, 1365 are configured to detect LWIR light, and wherein a concentration of a target mineral that selectively reflects LWIR light is thereby optically detectable within the interior image data 1245.

49. The system of any of the SPECTRAL IMAGING SYSTEM CLAUSES above, wherein the one or more light sources comprise a visible and near-infrared (VNIR) emitter 274, wherein at least some of the one or more electro-optic detectors 265, 1365 are configured to detect VNIR light, and wherein a concentration of a target mineral that selectively reflects VNIR light is thereby optically detectable within the interior image data 1245.

50. The system of any of the SPECTRAL IMAGING SYSTEM CLAUSES above, wherein the one or more light sources comprise a near-infrared (NIR) emitter 275, wherein at least some of the one or more electro-optic detectors 265, 1365 are configured to detect NIR light, and wherein a concentration of a target mineral that selectively reflects NIR light is thereby optically detectable within the interior image data 1245.

51. The system of any of the SPECTRAL IMAGING SYSTEM CLAUSES above, wherein the one or more light sources comprise a broad-spectrum optical emitter 280 (implemented as a broad-spectrum tungsten-filament lamp, e.g.).

52. The system of any of the SPECTRAL IMAGING SYSTEM CLAUSES above, comprising:
a drill rig configured to withdraw a first drill from said first borehole and to magnetically engage said imaging module, wherein said imaging module is configured to quantify an infrared energy characteristic of in situ material undergoing an exothermic reaction resulting from recent exposure to air as a component of said interior image data.

53. The system of any of the SPECTRAL IMAGING SYSTEM CLAUSES above, comprising:
a drill rig configured to withdraw a first drill from said first borehole and to mechanically engage said imaging module, wherein said imaging module is configured to quantify an infrared energy characteristic of in situ material undergoing an exothermic reaction resulting from recent exposure to air as a component of said interior image data.

54. The system of any of the SPECTRAL IMAGING SYSTEM CLAUSES above, wherein the one or more light sources comprise a broad-spectrum tungsten-filament lamp.

55. The system of any of the SPECTRAL IMAGING SYSTEM CLAUSES above, wherein the one or more mirrors are fixedly supported by the housing 1410, wherein the housing 1410 is configured to rotate relative to the borehole, and wherein the transparent side wall 1430 does not extend around an entirety of the housing 1410 (i.e. does not extend around its entire circumference).

56. (Independent) An energy-conscious differential BLAST IMPLEMENTATION SYSTEM comprising:

transistor-based circuitry (at one or more local hub servers 800A or cloud servers 800B, e.g.) configured to obtain seismic-while-drilling data 1235 acquired while drilling numerous blast holes 102 (i.e. dozens or hundreds or more) distributed along a mine bench 100 each in association with XYZ location data 1250 (as global positioning system coordinates, e.g.);

transistor-based circuitry (module 1021, e.g.) configured to obtain measurement-while-drilling data 1240 that depicts one or more blast holes 102A of the numerous blast holes 102 along the mine bench 100;

transistor-based circuitry (module 1022, e.g.) configured selectively to allow a neural network 530 to facilitate (implement or express, e.g.) a differential blast design 650 that targets a first bench part 170A along the mine bench 100 more weakly than the differential blast design 650 targets a second bench part 170B along the mine bench partly based on the seismic-while-drilling data 1235 acquired while drilling the numerous blast holes along the mine bench and partly based on the measurement-while-drilling data 1240 acquired while drilling at least some of the numerous blast holes 102 along the mine bench 100, wherein the differential blast design 650 associates a first aggregate blast energy density 173A ("D1") prospectively with the first bench part, wherein the differential blast design 650 associates a second aggregate blast energy density 173B ("D2") prospectively with the second bench part, wherein the differential blast design 650 targets the first bench part more weakly insofar that $D1<0.7*D2$ as a conditional response to a geometric model (directly or indirectly) indicating both a low aggregate concentration 175A of a first target mineral in the first bench part and a high aggregate concentration 175B of the first target mineral in the second bench part (i.e. relative to one or more industry-recognized marginal concentrations of that mineral), and wherein the high aggregate concentration is more than twice the low aggregate concentration; and transistor-based circuitry (module 1023, e.g.) configured to implement the differential blast design 650 that targets the first bench part more weakly than the differential blast design 650 targets the second bench part partly based on the seismic-while-drilling data and partly based on the measurement-while-drilling data 1240 acquired while drilling at least some of the numerous blast holes 102 along the mine bench 100 by (causing or otherwise) allowing one or more mobile manufacturing units (MMU's) 1223 to deposit explosive material 188 into most or all of the numerous blast holes distributed along the mine bench according to the differential blast design 650.

57. The system of BLAST IMPLEMENTATION SYSTEM CLAUSE 56, comprising:

the one or more mobile manufacturing units, configured to fully implement a component of the differential blast design 650 by triggering a deposition of the explosive material into most or all of the numerous blast holes distributed along the mine bench according to the differential blast design 650.

58. The system of BLAST IMPLEMENTATION SYSTEM CLAUSE 56, wherein the geometric model indicating both the low aggregate concentration 175A of the first target mineral in the first bench part and the high aggregate concentration 175B of the first target mineral in the second bench part is provided as user input.

59. The system of BLAST IMPLEMENTATION SYSTEM CLAUSE 56, wherein the geometric model indicating both the low aggregate concentration 175A of the first target mineral in the first bench part and the high aggregate concentration 175B of the first target mineral in the second bench part is provided by the neural network 530.

60. The system of BLAST IMPLEMENTATION SYSTEM CLAUSE 56, wherein the geometric model indicating both the low aggregate concentration 175A of the first target mineral in the first bench part and the high aggregate concentration 175B of the first target mineral in the second bench part is provided by the neural network 530.

61. The system of BLAST IMPLEMENTATION SYSTEM CLAUSE 56, comprising:

a first MMU of the one or more mobile manufacturing units, configured according to a first component of the differential blast design; and a second MMU of the one or more mobile manufacturing units, configured according to a second component of the differential blast design 62. The system of BLAST IMPLEMENTATION SYSTEM CLAUSE 56, comprising:

transistor-based circuitry configured to obtain (panoramic or other) interior image data 1245 that depicts at least one blast hole 102A (one or more images from each, e.g.) of the numerous blast holes 102 along the mine bench after the at least one blast hole is complete, wherein the geometric model is at least partly based upon the interior image data indicating both the low aggregate concentration 175A and the high aggregate concentration 175B.

63. The system of BLAST IMPLEMENTATION SYSTEM CLAUSE 56, wherein the transistor-based circuitry all resides in a local hub server 800A and in a proximity of the one or more mobile manufacturing units (within the same quarry 300 or other facility 900, e.g.).

64. The system of BLAST IMPLEMENTATION SYSTEM CLAUSE 56, wherein some of the transistor-based circuitry resides in the hub and in a proximity of the plurality of the one or more mobile manufacturing units and wherein a remainder of the transistor-based circuitry resides (in a cloud server 800B, e.g.) remote from the one or more mobile manufacturing units 1223.

65. The system of BLAST IMPLEMENTATION SYSTEM CLAUSE 56, wherein the differential blast design 650 associates the second bench part with a total blast energy E2 greater than 40,000 megajoules (MJ) and with a volume V2 less than 5,000 cubic meters (m^3) such that $E2/V2=D2>8$ MJ/m^3 and wherein the differential blast design 650 associates the first bench part with a total blast energy E1 and with a volume V1 such that $E1/V1=D1<6$ MJ/m^3.

66. The system of any of the above BLAST IMPLEMENTATION SYSTEM CLAUSES, wherein the system is configured to perform one of the BLAST IMPLEMENTATION METHOD CLAUSES below.

67. (Independent) An energy-conscious differential BLAST IMPLEMENTATION METHOD comprising:

invoking transistor-based circuitry (at one or more local hub servers 800A or cloud servers 800B, e.g.) configured to obtain seismic-while-drilling data 1235 acquired while drilling numerous blast holes 102 distributed along a mine bench 100 each in association with XYZ location data 1250 (as global positioning system coordinates, e.g.);

invoking transistor-based circuitry (module 1021, e.g.) configured to obtain measurement-while-drilling data 1240 that depicts one or more blast holes 102A of the numerous blast holes 102 along the mine bench 100;

invoking transistor-based circuitry (module 1022, e.g.) configured selectively to allow a neural network 530 to facilitate a differential blast design 650 that targets a first bench part 170A along the mine bench 100 more weakly than the differential blast design 650 targets a second bench part 170B along the mine bench partly based on the seismic-while-drilling data 1235 acquired while drilling the numerous blast holes along the mine bench and partly based on the measurement-while-drilling data 1240 acquired while drilling at least some of the numerous blast holes 102 along the mine bench 100, wherein the differential blast design 650 associates a first aggregate blast energy density 173A ("D1") prospectively with the first bench part, wherein the differential blast design 650 associates a second aggregate blast energy density 173B ("D2") prospectively with the second bench part, wherein the differential blast design 650 targets the first bench part more weakly insofar that D1<0.7*D2 as a conditional response to a geometric model indicating both a low aggregate concentration 175A of a first target mineral in the first bench part and a high aggregate concentration 175B of the first target mineral in the second bench part (i.e. relative to one or more industry-recognized marginal concentrations of that mineral), and wherein the high aggregate concentration is more than twice the low aggregate concentration; and invoking transistor-based circuitry (module 1023, e.g.) configured to implement the differential blast design 650 that targets the first bench part more weakly than the differential blast design 650 targets the second bench part partly based on the seismic-while-drilling data and partly based on the measurement-while-drilling data 1240 acquired while drilling at least some of the numerous blast holes 102 along the mine bench 100 by (causing or otherwise) allowing one or more mobile manufacturing units (MMU's) 1223 to deposit explosive material 188 into most or all of the numerous blast holes distributed along the mine bench according to the differential blast design 650.

68. The method of any of the BLAST IMPLEMENTATION METHOD CLAUSES above, comprising:

establishing the differential blast design 650 so as to associate the second bench part with a total blast energy E2 and with a volume V2 such that E2/V2=D2>8 MJ/m^3, wherein MJ means megajoules, wherein m^3 means cubic meters, and wherein the differential blast design 650 associates the first bench part with a total blast energy E1 and with a volume V1 such that E1/V1=D1<6 MJ/m^3.

69. The method of any of the BLAST IMPLEMENTATION METHOD CLAUSES above, wherein the differential blast design comprises the geometric model indicating both the low aggregate concentration 175A of the first target mineral in the first bench part and the high aggregate concentration 175B of the first target mineral in the second bench part.

70. The method of any of the BLAST IMPLEMENTATION METHOD CLAUSES above, comprising:

invoking transistor-based circuitry configured to obtain panoramic interior image data 1245 that depicts at least one of the one or more blast holes 102 along the mine bench in association with XYZ location data 1250 (as global positioning system coordinates, e.g.); and allowing a neural network 530 to generate the differential blast design 650 that targets the first bench part 170A along the mine bench 100 more weakly than the differential blast design 650 targets the second bench part 170B along the mine bench partly based on the panoramic interior image data 1245 that depicts at least one of the one or more blast holes 102 along the mine bench in association with XYZ location data 1250.

71. The method of any of the BLAST IMPLEMENTATION METHOD CLAUSES above, wherein the invoking transistor-based circuitry configured to allow the one or more mobile manufacturing units to deposit the explosive material according to the differential blast design 650 comprises:

invoking the transistor-based circuitry configured to allow the one or more mobile manufacturing units to deposit the explosive material according to the differential blast design 650 by (causing or otherwise) allowing the one or more mobile manufacturing units 1223 to deposit explosive material into most or all of the numerous blast holes distributed along the mine bench according to the differential blast design 650.

72. The method of any of the BLAST IMPLEMENTATION METHOD CLAUSES above, wherein the differential blast design 650 associates the first bench part with a first peak particle velocity distribution PPVD1 that corresponds with the first aggregate blast energy density D1 and wherein the differential blast design 650 also associates the second bench part with a second peak particle velocity distribution PPVD2 that corresponds with the second aggregate blast energy density D2 such that D2/D1>2.

73. The method of any of the BLAST IMPLEMENTATION METHOD CLAUSES above, comprising obtaining interior image data that depicts one or more blast holes of the numerous blast holes distributed along the mine bench by configuring a hyperspectral imaging module 260 with an imaging element 270 (a fish eye lens 267 or conical/parabolic mirror 268, e.g.) small enough to enter the one or more blast holes 102 so as to capture circumferential/annular image data 1245 of each of the one or more blast holes.

74. The method of any of the BLAST IMPLEMENTATION METHOD CLAUSES above, comprising:

withdrawing a first drill 1225 from a first blast hole of the one or more blast holes using a first drill rig 1226; and capturing a first component of interior image data 1245 using a photographic apparatus 1228 in the first blast hole, wherein the photographic apparatus 1228 has been configured to quantify infrared energy characteristic of in situ material 206 undergoing an exothermic reaction resulting from recent exposure to air (within a day, e.g.).

75. The method of any of the BLAST IMPLEMENTATION METHOD CLAUSES above, comprising capturing interior image data that depicts the one or more blast holes of the numerous blast holes distributed along the mine bench by:

withdrawing a first drill 1225 from a first blast hole 102 of the one or more blast holes using a first drill rig 1226;

capturing a first component of interior image data 1245 using a photographic apparatus 1228 in the first blast hole; and moving the first drill rig away from the first blast hole only after capturing the first component of the interior image data 1245 using the photographic apparatus in the first blast hole.

76. The method of any of the BLAST IMPLEMENTATION METHOD CLAUSES above, wherein the invoking transistor-based circuitry configured to allow the neural network to facilitate the differential blast design 650 that targets the first bench part more weakly than the differential blast design 650 targets the second bench part comprises:

implementing the neural network 530 as a convolutional neural network.

77. The method of any of the BLAST IMPLEMENTATION METHOD CLAUSES above, wherein the invoking transistor-based circuitry configured to allow the neural network to facilitate the differential blast design 650 that targets the first bench part more weakly than the differential blast design 650 targets the second bench part comprises:

adapting the neural network (as a design constraint 532, e.g.) to cause the differential blast design 650 to target the first bench part more weakly than the differential blast design 650 targets the second bench by more than 90% (i.e. with D1<0.1*D2) so as to minimize an unwarranted risk of dangerous fly rock (emanating from the first bench part, e.g.) in response to an indication (manifested in a geometric model that depicts a large fragmentation zone, e.g.) that a majority of the first bench part is gravel.

78. The method of any of the BLAST IMPLEMENTATION METHOD CLAUSES above, wherein the invoking transistor-based circuitry configured to allow the neural network to facilitate the differential blast design 650 that targets the first bench part more weakly than the differential blast design 650 targets the second bench part comprises:

configuring an apparatus comprising one or more cameras to include a hyperspectral borehole probe; and obtaining from a hyperspectral component of interior image data an indication that the first concentration of the first target mineral in the first bench part is less than half of the second of the first target mineral in the second bench part before the differential blast design 650 is implemented.

79. The method of any of the BLAST IMPLEMENTATION METHOD CLAUSES above, wherein the invoking transistor-based circuitry configured to allow the one or more mobile manufacturing units to deposit the explosive material according to the differential blast design 650 comprises:

drilling a first row 141 of at least ten (nominally) regularly-spaced blast holes along the mine bench;

drilling a second row 142 of at least ten (nominally) regularly-spaced blast holes along the bench; and implementing the differential fragmentation blast design as a conditional response to the second bench part of the mine bench extending between the first and second rows by drilling a first interstitial blast hole 152 (within the first or second row or between the rows, e.g.) within the second bench part 170B of the mine bench.

80. The method of any of the BLAST IMPLEMENTATION METHOD CLAUSES above, wherein the invoking transistor-based circuitry configured to allow the one or more mobile manufacturing units to deposit the explosive material according to the differential blast design 650 comprises:

aggregating the SWD data 1235 by recording an acoustic signal via each of several geophones 1227 placed along a surface of the mine bench while drilling a first (particular) blast hole of the numerous blast holes 102;

calculating (at least partly) based on the SWD data 1235 a peak particle velocity model 670 that includes a peak particle velocity estimate (speed 671 and direction 672, e.g.) of each of numerous positions 410 (thousands, e.g.) throughout the strip mining bench using an expected signature of a detonation of the numerous blast holes (expressed as one or more of a PPV model 670, a fragmentation model 680, or loading plan 690, e.g.) as the differential blast design 650, wherein the numerous blast holes include the first blast hole; and commanding the one or more MMU's 1223 to deposit (various explosive and non-explosive components of) the explosive material 188 into the numerous blast holes distributed along the mine bench according to the differential blast design 650 that targets the first bench part more weakly than the differential blast design 650 targets the second bench part as an automatic and conditional response to an authorization 1285 from a user 1230 after presenting (at least) the peak particle velocity estimate to the user (via local hub server 800A, e.g.).

81. The method of any of the BLAST IMPLEMENTATION METHOD CLAUSES above, wherein the invoking transistor-based circuitry configured to allow the one or more mobile manufacturing units to deposit the explosive material according to the differential blast design 650 comprises:

aggregating seismic-while-drilling (SWD) data by recording an acoustic signal via each of several geophones placed along a surface of the mine bench 100 while drilling a first one of the numerous blast holes;

calculating (at least partly) based on the seismic-while-drilling data a predicted fragmentation model 680 that includes a fragmentation estimate (expressed as a distribution of fragment masses 681 or diameters 682, e.g.) of each of numerous portions (points or other positions 410, e.g.) of the mine bench using an expected signature of a detonation of the numerous blast holes as the differential blast design 650, wherein the numerous blast holes include the first blast hole; and commanding the one or more MMU's 1223 to deposit the explosive material into the numerous blast holes distributed along the mine bench according to the differential blast design 650 that targets the first bench part more weakly than the differential blast design 650 targets the second bench part as an automatic and conditional response to an authorization 1285 from a user after presenting the predicted fragmentation estimate to the user.

82. The method of any of the BLAST IMPLEMENTATION METHOD CLAUSES above, wherein the invoking transistor-based circuitry configured to allow the one or more mobile manufacturing units to deposit the explosive material according to the differential blast design 650 comprises:

expressing the differential blast design 650 as a loading plan and transmitting the loading plan to the one or more mobile manufacturing units.

83. The method of any of the BLAST IMPLEMENTATION METHOD CLAUSES above, wherein the invoking transistor-based circuitry configured to allow the one or more mobile manufacturing units to deposit the explosive material according to the differential blast design 650 comprises:

dividing the differential blast design 650 into several components 1295 including a first and second component such that each of the several components is a subset of the differential blast design 650; and transmitting the first component 1295A of the differential blast design 650 to a first MMU 1223A and the second component 1295B of the differential blast design 650 to a second MMU 1223B, wherein the first and second MMU's comprise the one or more MMU's.

84. The method of any of the BLAST IMPLEMENTATION METHOD CLAUSES above, wherein the invoking transistor-based circuitry configured to implement the differential blast design 650 comprises:

implementing the differential blast design 650 so that most or all of the first bench part (a majority by mass, e.g.) is broken into fragments 926A (each with a largest dimension 927A that is) greater than 3 centimeters and less than 3 meters across and so that most or all of the second bench part is broken into fragments 926B (each with a longest dimension 927B that is) less than 3 centimeters across both during a single blast.

85. The method of any of the BLAST IMPLEMENTATION METHOD CLAUSES above, wherein the invoking transistor-based circuitry configured to implement the differential blast design 650 comprises:

implementing the differential blast design 650 so that most or all of the first bench part (i.e. most or all, by mass) is broken into fragments 926A (each with a mass that is) greater than 2 kilograms and less than 200 kilograms and so that most or all of the second bench part is broken into fragments 926B (each with a mass that is) less than 5 kilograms during a single blast.

86. The method of any of the BLAST IMPLEMENTATION METHOD CLAUSES above, wherein the invoking transistor-based circuitry configured to implement the differential blast design 650 comprises:

implementing the differential blast design 650 so as also to target a third bench part so that most or all of the third bench part is broken into fragments 926 greater than 1 gram and less than 1 kilogram during a single blast.

87. The method of any of the BLAST IMPLEMENTATION METHOD CLAUSES above, comprising obtaining interior image data using a SPECTRAL IMAGING SYSTEM CLAUSE herein that depicts one or more blast holes of the numerous blast holes distributed along the mine bench by configuring a hyperspectral imaging module 260 with an imaging element 270 (a fish eye lens 267 or conical/parabolic mirror 268, e.g.) small enough to enter the one or more blast holes 102 so as to capture circumferential/annular image data 1245 of each of the one or more blast holes.

88. The method of any of the BLAST IMPLEMENTATION METHOD CLAUSES above, wherein before the one or more MMU's deposit the explosive material into the numerous blast holes a method of one of the SURVEYING METHOD CLAUSES above is performed and wherein the neural network 530 generates the differential blast design that targets the first bench part along the mine bench more weakly than the differential blast design targets the second bench part along the mine bench partly based on the one or more geological properties 1887 of the material body, and wherein the mine bench (includes or otherwise) intersects the material body.

89. The method of any of the BLAST IMPLEMENTATION METHOD CLAUSES above, wherein before the one or more MMU's deposit the explosive material into the numerous blast holes a method of one of the SURVEYING METHOD CLAUSES above is performed, wherein the neural network 530 generates the differential blast design that targets the first bench part along the mine bench more weakly than the differential blast design targets the second bench part along the mine bench partly based on a seismic spatial model indicating the one or more geological properties of the material body, wherein the mine bench intersects the material body, and wherein the one or more geological properties includes one or more of rock impedance 1883, Young's modulus 1885, or shear strain 1886.

90. The method of any of the BLAST IMPLEMENTATION METHOD CLAUSES above, comprising:

invoking transistor-based circuitry (a processing module 2023 implementing or operably coupled to one or more hubs 1640, e.g.) configured to facilitate a seismic spatial model (including high resolution spatial properties 540 at least partly based on one or more seismic delay indices 1642, e.g.) of one or more geological properties of a material body 1680 by synchronizing an onboard indication and a geological signal across one or more wireless signal paths 1673, 1683 (forming one or more synchronization signal or other event-sequencing links 1716, e.g.) spanning (at least) one or more free space media 1711 (air, e.g.) between a first electromagnetic transducer 1730A operably coupled to one or more vibration sensors 1895 aboard the movable part of the drill rig 1226 and a second electromagnetic transducer 1730B operably coupled (via a cable 1858 or wireless link 1716, e.g.) to the one or more geophones 1227 mechanically coupled to the material body 1680, wherein the geometric model comprises the seismic spatial model.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A surveying method for use with a drill rig that includes a drill bit adjacent a material body of a mine, the surveying method comprising:

detecting an onboard indication of a movement of said drill bit via one or more vibration sensors aboard a movable part of said drill rig, wherein a first electromagnetic transducer is operably coupled to said one or more vibration sensors aboard said movable part of said drill rig;

detecting a geological signal that indicates both said movement of said drill bit and one or more geological properties of said material body via an array of several geophones mechanically coupled to said material body, wherein a second electromagnetic transducer is operably coupled to said array of several geophones mechanically coupled to said material body of said mine; and synchronizing said onboard indication and said geological signal that indicates both said movement of said drill bit and said one or more geological properties of said material body via said array of several geophones across one or more wireless signal paths spanning one or more free space media between said first electromagnetic transducer operably coupled to said one or more vibration sensors aboard said movable part of said drill rig and said second electromagnetic transducer operably coupled to said array of several geophones mechanically coupled to said material body of said mine without using any synch times stored aboard said movable part of said drill rig, wherein said synch time is instead established by transmitting a frequency-modulated electromagnetic synchronizing signal indicative of a synchronizing event via said first electromagnetic transducer and said second electromagnetic transducer across said one or more wireless signal paths spanning said one or more free space media between said first electromagnetic transducer operably coupled to said one or more vibration sensors aboard said movable part of said drill rig and said second electromagnetic transducer operably coupled to said array of several geophones mechanically coupled to said material body of said mine, and wherein a frequency modulation of said frequency-modulated electromagnetic synchronizing signal signifies said synchronizing event.

2. The surveying method of claim 1, comprising:
operably coupling said array of several geophones with a hub via a wireless internet-of-things platform.

3. The surveying method of claim 1, wherein said synchronizing said onboard indication and said geological signal that indicates both said movement of said drill bit and said one or more geological properties of said material body via said array of several geophones across said one or more wireless signal paths spanning said one or more free space media between said first electromagnetic transducer operably coupled to said one or more vibration sensors aboard said movable part of said drill rig and said second electromagnetic transducer operably coupled to said array of several geophones mechanically coupled to said material body of said mine without using any synch times stored aboard said movable part of said drill rig comprises:
temporally synchronizing said geological signal that indicates both said movement of said drill bit and said one or more geological properties of said material body via one or more geophones mechanically coupled to said material body with a measurement signal indicative of said movement of said drill bit via said one or more vibration sensors aboard said movable part of said drill rig by arithmetically combining using timestamp data from a geophone module and timestamp data from a measurement module configured to provide measurement-while-drilling data, wherein said array of several geophones includes said one or more geophones mechanically coupled to said material body, and wherein said geophone module includes at least one of said several geophones.

4. A surveying method for use with a drill rig that includes a drill bit adjacent a material body of a mine, the surveying method comprising:
detecting an onboard indication of a movement of said drill bit via one or more vibration sensors aboard a movable part of said drill rig, wherein a first electromagnetic transducer is operably coupled to said one or more vibration sensors aboard said movable part of said drill rig;
detecting a geological signal that indicates both said movement of said drill bit and one or more geological properties of said material body via one or more geophones mechanically coupled to said material body, wherein a second electromagnetic transducer is operably coupled to said one or more geophones mechanically coupled to said material body of said mine; and
synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine.

5. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
the second electromagnetic transducer receiving an analog indication of a synch time manifested at said first electromagnetic transducer and via a wireless link across said one or more wireless signal paths spanning one or more free space media without storing a digital expression of the synch time.

6. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
a hub synchronizing said onboard indication and said geological signal across said one or more wireless signal paths between said first electromagnetic transducer operably coupled to said one or more vibration sensors aboard said movable part of said drill rig and said second electromagnetic transducer operably coupled to said one or more geophones mechanically coupled to said material body, said hub being part of a geophone module that includes at least one of said one or more geophones.

7. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
synchronizing said onboard indication and said geological signal across a wireless signal path of said one or more wireless signal paths spanning one or more free space media from said first electromagnetic transducer operably coupled to said one or more vibration sensors aboard said movable part of said drill rig to said second electromagnetic transducer operably coupled to said one or more geophones mechanically coupled to said material body of said mine.

8. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
synchronizing said onboard indication and said geological signal across a wireless signal path of said one or more wireless signal paths spanning one or more free space media from said electromagnetic transducer operably coupled to said one or more vibration sensors aboard said movable part of said drill rig to said second electromagnetic transducer operably coupled to said one or more geophones mechanically coupled to said material body of said mine, wherein a measurement module configured to provide measurement-while-drilling data does not store any synch times but instead manifests a synch time by transmitting electromagnetic energy indicative of a synchronizing event via said first electromagnetic transducer to said second electromagnetic transducer.

9. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
synchronizing said onboard indication and said geological signal across two or more wireless signal paths, from a global positioning system (GPS) satellite to said electromagnetic transducer operably coupled to said one or more vibration sensors aboard said movable part of said drill rig and to said second electromagnetic transducer operably coupled to said one or more geophones mechanically coupled to said material body of said mine both, and wherein electromagnetic energy passing from said GPS satellite to said first and second electromagnetic transducers define two of said two or more wireless signal paths.

10. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
synchronizing said onboard indication and said geological signal across two or more wireless signal paths of said one or more wireless signal paths spanning one or more free space media, from a global positioning system (GPS) satellite to said electromagnetic transducer operably coupled to said one or more vibration sensors aboard said movable part of said drill rig and to said second electromagnetic transducer operably coupled to said one or more geophones mechanically coupled to said material body of said mine both, wherein electromagnetic energy passing from said GPS satellite to said first and second electromagnetic transducers define two of said two or more wireless signal paths, wherein said onboard indication is synchronized to a first pulse from said GPS satellite, and wherein said geological signal is synchronized to a second pulse from said GPS satellite and not to said first pulse.

11. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
synchronizing said onboard indication and said geological signal across two or more wireless signal paths of said one or more wireless signal paths spanning one or more free space media, from a wireless local area network (WLAN) tower to said electromagnetic transducer operably coupled to said one or more vibration sensors aboard said movable part of said drill rig and to said second electromagnetic transducer operably coupled to said one or more geophones mechanically coupled to said material body of said mine both.

12. The surveying method of claim 4, comprising:
obtaining span coordinates and a delay index associated with said span coordinates indicative of seismic signal start and end positions all as components of a geometric model; and
processing said geometric model that characterizes said one or more geological properties of said material body through a neural network.

13. The surveying method of claim 4, comprising:
synchronizing transistor-based circuitry configured to detect said onboard indication of said movement of said drill bit via said one or more vibration sensors aboard said movable part of said drill rig with transistor-based circuitry configured to detect said geological signal that indicates both said movement of said drill bit and said one or more geological properties of said material body via said one or more geophones mechanically coupled to said material body across said one or more wireless signal paths between said first electromagnetic transducer operably coupled to said one or more vibration sensors aboard said movable part of said drill rig and said second electromagnetic transducer operably coupled to said one or more geophones mechanically coupled to said material body of said mine.

14. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:
distilling a result of combining seismic data from a first geophone module with measurement-while-drilling data from a first measurement module by synchronizing timestamp data from said first measurement module and from said first geophone module, wherein said first geophone module includes at least one of said one or more geophones and wherein said first measurement module manifests a synch time by transmitting electromagnetic energy indicative of a synchronizing event via said first electromagnetic transducer to said second electromagnetic transducer.

15. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:

distilling a result of combining seismic data from a first geophone module with measurement-while-drilling data from a first measurement module by synchronizing timestamp data from said first measurement module and from said first geophone module, wherein said first geophone module includes at least one of said one or more geophones.

16. The surveying method of claim 4, wherein said synchronizing said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:

synchronizing said onboard indication and said geological signal across a wireless signal path of said one or more wireless signal paths spanning one or more free space media from said electromagnetic transducer operably coupled to said one or more vibration sensors aboard said movable part of said drill rig to said second electromagnetic transducer operably coupled to said one or more geophones mechanically coupled to said material body of said mine, wherein a measurement module configured to provide measurement-while-drilling data manifests a synch time by transmitting electromagnetic energy indicative of a synchronizing event via said first electromagnetic transducer to said second electromagnetic transducer.

17. A surveying system for use with a drill rig that includes a drill bit adjacent a material body of a mine, said surveying system comprising:

transistor-based circuitry configured to detect an onboard indication of a movement of said drill bit via one or more vibration sensors aboard a movable part of said drill rig, wherein a first electromagnetic transducer is operably coupled to said one or more vibration sensors aboard said movable part of said drill rig;

transistor-based circuitry configured to detect a geological signal that indicates both said movement of said drill bit and one or more geological properties of said material body via one or more geophones mechanically coupled to said material body, wherein a second electromagnetic transducer is operably coupled to said one or more geophones mechanically coupled to said material body of said mine; and transistor-based circuitry configured to synchronize said onboard indication and said geological signal that indicates both said movement of said drill bit and said one or more geological properties of said material body via said one or more geophones mechanically coupled to said material body across one or more wireless signal paths spanning one or more free space media between said first electromagnetic transducer operably coupled to said one or more vibration sensors aboard said movable part of said drill rig and said second electromagnetic transducer operably coupled to said one or more geophones mechanically coupled to said material body of said mine.

18. The surveying system of claim 17, wherein said transistor-based circuitry configured to synchronize said onboard indication and said geological signal that indicates both said movement of said drill bit and said one or more geological properties of said material body via said one or more geophones mechanically coupled to said material body across said one or more wireless signal paths spanning said one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:

a hub implemented as a local hub server configured to perform said synchronizing said onboard indication and said geological signal across said one or more wireless signal paths between said first electromagnetic transducer operably coupled to said one or more vibration sensors aboard said movable part of said drill rig and said second electromagnetic transducer operably coupled to said one or more geophones mechanically coupled to said material body.

19. The surveying system of claim 17, wherein said transistor-based circuitry configured to synchronize said onboard indication and said geological signal that indicates both said movement of said drill bit and said one or more geological properties of said material body via said one or more geophones mechanically coupled to said material body across said one or more wireless signal paths spanning said one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:

a hub configured to distill a result of combining seismic data from a first geophone module with measurement data from a first measurement module by synchronizing timestamp data from said first measurement module and from said first geophone module, wherein said first geophone module includes at least one of said one or more geophones.

20. The surveying system of claim 17, wherein said transistor-based circuitry configured to synchronize said onboard indication and said geological signal that indicates both said movement of said drill bit and said one or more geological properties of said material body via said one or more geophones mechanically coupled to said material body across said one or more wireless signal paths spanning said one or more free space media between said first electromagnetic transducer operably coupled to said one or more vibration sensors aboard said movable part of said drill rig and said second electromagnetic transducer operably coupled to said one or more geophones mechanically coupled to said material body of said mine comprises:

a first measurement module including said one or more vibration sensors affixed to said movable part of said drill rig so that a movement of the drill bit can provide measurement-while-drilling data, wherein said first measurement module includes a local clock and is configured to record a corresponding local synchronization offset relative to said local clock, wherein said movable part of said drill rig includes a drill string, and wherein said first measurement module also includes an accelerometer and a strain gauge configured to monitor harmonic dampening of said drill string.

* * * * *